US012498591B2

(12) United States Patent
Alster et al.

(10) Patent No.: US 12,498,591 B2
(45) Date of Patent: Dec. 16, 2025

(54) SPHERICAL ASTIGMATISM CORRECTING CONTACT LENSES

(71) Applicant: JOURNEY1, Inc., South San Francisco, CA (US)

(72) Inventors: Yair Alster, Tel Aviv (IL); Eugene De Juan, Jr., San Francisco, CA (US); Omer Rafaeli, Rishpon (IL); Barak Azmon, Tel Aviv (IL); Matt Clarke, South San Francisco, CA (US)

(73) Assignee: JOURNEY1 INC., South San Francisco, CA (US)

( * ) Notice: Subject to any disclaimer, the term of this patent is extended or adjusted under 35 U.S.C. 154(b) by 0 days.

(21) Appl. No.: 19/023,810

(22) Filed: Jan. 16, 2025

(65) Prior Publication Data

US 2025/0155728 A1    May 15, 2025

Related U.S. Application Data

(63) Continuation of application No. PCT/US2023/075449, filed on Sep. 28, 2023.

(60) Provisional application No. 63/377,712, filed on Sep. 29, 2022.

(51) Int. Cl.
G02C 7/04    (2006.01)

(52) U.S. Cl.
CPC ............. *G02C 7/049* (2013.01); *G02C 7/042* (2013.01); *G02C 7/044* (2013.01); *G02C 7/045* (2013.01)

(58) Field of Classification Search
CPC ........ G02C 7/049; G02C 7/042; G02C 7/044; G02C 7/045

USPC ................................ 351/41, 159.01, 159.02
See application file for complete search history.

(56) References Cited

U.S. PATENT DOCUMENTS

| 9,195,073 | B2 | 11/2015 | Fritsch |
| 9,943,401 | B2 | 4/2018 | De Juan, Jr. et al. |
| 2013/0278890 | A1* | 10/2013 | de Juan, Jr. ...... B29D 11/00048 351/159.04 |

(Continued)

FOREIGN PATENT DOCUMENTS

| WO | WO2020-049356 | 3/2020 |
| WO | WO2022-086756 | 4/2022 |

OTHER PUBLICATIONS

NPL—International Preliminary Report on Patentability dated Apr. 10, 2025 in respect of PCT/US2023/075449.

*Primary Examiner* — Tuyen Tra
(74) *Attorney, Agent, or Firm* — Mark S. Cohen; PEARL COHEN ZEDEK LATZER BARATZ LLP

(57) ABSTRACT

Contact lenses for the treatment of a refractive error, particularly astigmatism, are provided. An exemplary lens comprises a soft continuous lens body configured to cover a corneal surface, the lens body having a posterior surface to be suspended over the corneal surface forming a free volume thereover, and at least one discrete discontinuity. The free volume may be configured to fill with tear fluid, forming a tear lens over the corneal surface for correcting the ocular refractive error. The discrete discontinuity may allow a portion of the lens body to conform to a meridian of the eye without substantially distorting an optical region of the lens body. The discrete discontinuity may allow tear fluid to flow into and out of the free volume to form the tear lens. Optical correction is provided by a combination of the optical region of the lens body and the tear lens.

19 Claims, 12 Drawing Sheets

(56) References Cited

U.S. PATENT DOCUMENTS

2020/0201078 A1   6/2020  Kuiper et al.
2021/0181530 A1*  6/2021  Alster .................... G02C 7/049
2023/0359067 A1* 11/2023  Pauné Fabré ............ G02C 7/04

* cited by examiner

SPHERICAL ASTIGMATISM CORRECTING CONTACT LENSES

CROSS REFERENCE

This application is a Continuation of PCT International Application No. PCT/US2023/075449, International Filing Date Sep. 28, 2023, which claims the benefit of U.S. Provisional Application No. 63/377,712, filed Sep. 29, 2022, the contents of which are fully incorporated herein by reference.

BACKGROUND

Prior contact lenses and therapeutic coverings can be less than ideal in at least some instances. People who have an irregular cornea or aspheric cornea such as an astigmatism require a contact lens that will correct for refractive error in at least two meridians. Additionally, those people who have refractive error and who use contact lenses can have many different front surface optical powers. The optical power at each meridian, the angle between meridians, and/or the diameter across which the optical power difference occurs often differs from one individual to another. Current solutions for treatment of such corneal irregularities relies on a contact lens that has more than one base curve and with features to allow the lens to align and/or rotate to the particular astigmatism axis of the wearer, for example, by relying on structural elements such as a prism ballast, dynamic stabilization elements, and others. Such lenses are generally known as toric lenses. However, toric lenses typically require that multiple lenses be manufactured for each power difference and each angle between meridians. It is generally assumed that the opposite meridians have relatively similar curvatures and that a shift of +/−5 degrees is not usually very noticeable, so, with 10 degrees axis steps, hence 18 lenses are typically required for each sphere and cylindrical power combination to cover the range of astigmatisms a patient may have. There are therefore needs for solutions to reduce the number of different contact lenses needed to be manufactured and stored.

SUMMARY

The present disclosure is generally directed to vision and treatment of the eye to provide improved vision. Although specific reference is made to coverings for vision correction such as soft contact lenses, embodiments of the present disclosure may comprise additional uses and applications such as the correction of a refractive error of an eye, such as, for example an astigmatism.

In one aspect, the present disclosure provides a soft contact lens for correcting an ocular refractive error of an eye. In some embodiments, the soft contact lens includes a soft continuous lens body configured to cover a corneal surface of the eye. In some embodiments, the soft continuous lens body has an anterior surface, a posterior surface, and at least one discrete discontinuity. In some embodiments, the at least a portion of the posterior surface of the soft continuous lens body is configured to be suspended above a corneal surface of the eye when placed thereon forming a free volume between the posterior surface of the soft continuous lens body and the corneal surface. In some embodiments, at least a portion of the free volume is configured to be filled with a fluid to form a tear lens over the corneal surface for correcting an ocular refractive error of the eye.

In some embodiments, at least a portion of the soft continuous lens body is suspended further above the corneal surface when compared with another portion of the of the soft continuous lens body. In some embodiments, at least a portion of the soft continuous lens body is suspended above the corneal surface and another portion of the soft continuous lens body conforms to the corneal surface.

The at least the portion of the soft continuous lens body may comprise a first portion of the soft continuous lens body suspended above the corneal surface and a different second portion of the soft continuous lens body suspended above the surface of the cornea further, closer, or the same as the first portion of the soft continuous lens body.

In some embodiments, the soft continuous lens body has a uniform Young's modulus. In some embodiments, the soft continuous lens body has Young's modulus from about 0.1 Megapascals ("MPa") to about 4 MPa.

In some embodiments, the ocular refractive error originates from one or more of a corneal irregularity, coma, astigmatism, or higher order aberration of the eye. In some embodiments, the ocular refractive error is an astigmatism of the eye.

In another aspect, the present disclosure provides a soft contact lens for correcting an astigmatism of an eye. In some embodiments, the soft contact lens includes a soft continuous lens body configured to cover a corneal surface of the eye. In some embodiments, the soft continuous lens body has an anterior surface, a posterior surface, and at least one discrete discontinuity. In some embodiments, the soft continuous lens body has a uniform Young's modulus from about 0.1 MPa to about 4 MPa. In some embodiments, the at least a portion of the posterior surface of the soft continuous lens body is configured to be suspended above the corneal surface of the eye when placed thereon forming a free volume between the posterior surface of the soft continuous lens body and the corneal surface. In some embodiments, at least a portion of the free volume is configured to be filled with a fluid to form a tear lens over the corneal surface for correcting an astigmatism of the eye.

In some embodiments, the anterior surface of the soft continuous lens body is axially symmetric. In some embodiments, the anterior surface comprises an anterior curvature profile. In some embodiments, the anterior curvature profile is axially symmetric. In some embodiments, the posterior surface of the soft continuous lens body is axially symmetric. In some embodiments, the posterior surface comprises a posterior curvature profile. In some embodiments, the posterior curvature profile is axially symmetric. In some embodiments, the soft continuous lens body further comprises a lens volume. In some embodiments, the lens volume is axially symmetric. In some embodiments, the lens does not provide a cylindric optical power when in a neutral state. In some embodiments, the lens corrects an ocular refractive error or an optical aberration of the eye when placed thereon irrespective of the orientation of the lens to a meridian of the eye. In some embodiments, the lens corrects an ocular refractive error or an optical aberration of the without being rotationally fit to the eye. In some embodiments, the optical aberration of the eye is a first order aberration or spherical aberration. In some embodiments, the optical aberration of the eye is a second order aberration or cylindrical aberration. In some embodiments, the optical aberration is a third order aberration or coma.

In some embodiments, the lens is made of a single material. In some embodiments, the lens is made of a single material having the same mechanical properties throughout. In some embodiments, the lens is made of a single polymeric material. In some embodiments, the lens is made of a hydrogel, silicone hydrogel, or silicone. In some embodiments, the lens is made of a single material selected from diacetone acrylamide, N,N-dimethylacrylamide, 2-hydroxyethyl methacrylate, methacrylic acid, methyl methacrylate, N-carboxl vinyl ester, N-vinyl pyrrolidone, poly[dimethylsiloxyl] di[silybutanol]bis[vinyl carbamate], phosphorylcholine, tris-(trimethylsiloxysilyl) propylvinyl carbamate, tris-(hydroxylmethyl) aminomethane, siloxane, or polyvinylpyrrolidone.

In some embodiments, the soft continuous lens body has a rigidity range from about 1.25E+04 Megapascal*micrometers cubed ("MPa*µm$^3$") to about 5.00E+08 MPa*µm$^3$.

In some embodiments, the soft continuous lens body comprises one or more optical regions and/or one or more non-optical regions. In some embodiments, the one or more optical regions are each independently defined by a ratio between a radius of curvature at the posterior surface and a radius of curvature at the anterior surface. In some embodiments, the one or more optical regions each independently provide a different optical power to the eye. In some embodiments, the one or more optical regions are a plurality of optical regions. In some embodiments, the one or more optical regions are either simultaneous or segmented. In some embodiments, the one or more simultaneous optical regions are either concentric (concentric circles of varying curvature) or aspheric (has varying curvature across the surface of the lens rather than a uniformly spherical shape).

In some embodiments, the lenses are bifocal or multifocal lenses.

In some embodiments, the diameter of the one or more optical regions is from about 4 millimeters ("mm") to about 10 mm. In some embodiments, the diameter of the one or more optical regions is from about 6 mm to about 9 mm.

In some embodiments, the radius of curvature at the posterior surface of the one or more optical regions is from about 7 mm to about 9 mm. In some embodiments, the radius of curvature at the anterior surface of the one or more optical regions is from about 5.5 mm to about 11.5 mm. In some embodiments, the ratio of the radius of curvature at the posterior surface and anterior surface of the one or more optical regions is from about 3:5 to about 2:1.

In some embodiments, the soft continuous lens body has a uniform thickness throughout the optical region. In some embodiments, the soft continuous lens body has a non-uniform thickness throughout the optical region. In some embodiments, the thickness of the soft continuous lens body at the optical region is from about 50 micrometers ("µm") to about 500 µm. In some embodiments, the soft continuous lens body further comprises an axially symmetric lens volume.

In some embodiments, the non-optical region has a diameter of 2 mm to about 16 mm. In some embodiments, the optical region has a diameter of about 0 mm to about 10 mm.

In some embodiments, the at least one discrete discontinuity is positioned in the optical region. In some embodiments, the at least one discrete discontinuity is positioned in the non-optical region. In some embodiments, the at least one discrete discontinuity is positioned in both the optical and non-optical regions. In some embodiments, the at least one discrete discontinuity is positioned on the anterior surface of lens. In some embodiments, the at least one discrete discontinuity is positioned on the posterior surface of the lens. In some embodiments, the at least one discrete discontinuity is positioned on both the anterior and the posterior surface. In some embodiments, the at least one discrete discontinuity is a channel, fenestration, groove, opening, slit, thin portion, or any combination thereof. In some embodiments, the at least one discrete discontinuity is a channel. In some embodiments, the at least one discrete discontinuity is a channel further configured to allow a fluid to flow into and out of the free volume. In some embodiments, the at least one discrete discontinuity is a groove. In some embodiments, the at least one discrete discontinuity is a groove further configured to reduce mechanical distortion of the continuous lens body. In some embodiments, the at least one discrete discontinuity is a fenestration. In some embodiments, the at least one discrete discontinuity is a fenestration further configured to allow a fluid to flow into and out of the free volume. In some embodiments, the fenestration is configured to allow a fluid to flow into and out of the free volume, indirectly, by connecting through a channel. In some embodiments, at least a portion of the soft continuous lens body is configured to conform to the corneal surface of the eye forming a deformation of the continuous lens body. In some embodiments, the at least one discontinuity is further configured to substantially prevent translation of the deformation to a non-conforming portion of the soft continuous lens body.

In some embodiments, the lens does not have any protrusions extending from the posterior surface.

In some embodiments, the lens has a diameter from about 8 mm to about 17 mm.

In some embodiments, the free volume between the posterior surface of the soft continuous lens body and the corneal surface has a total volume from about 0.001 microliters ("µL") to 10 µL.

In some embodiments, at least one sector of the soft continuous lens body from a center of the soft continuous lens body to a peripheral edge of the soft continuous lens body is configured to be suspended over the corneal surface to form at least a portion of the free volume when the continuous lens body is disposed over the corneal surface. In some embodiments, any of the at least one sector of the soft continuous lens body is capable of being suspended over the corneal surface to form at least a portion of the free volume when the continuous lens body is disposed over the corneal surface.

In another aspect, the present disclosure provides a method for correcting an ocular refractive error of the eye using the soft contact lenses of the present disclosure.

In another aspect, the present disclosure provides a method for forming a tear lens using the soft contact lenses of the present disclosure. In some embodiments, applying to the eye the soft contact lens of the present disclosure causes the tear lens to form with an asymmetric volume distribution. In some embodiments, the asymmetric volume distribution corrects one or more of a corneal irregularity, coma, astigmatism, or higher order aberration of the eye. In some embodiments, in the asymmetric volume distribution, the volume of a first tear lens sector is different from the volume of a second tear lens sector diametrically opposed to the first tear lens sector. In some embodiments, the volume of the first tear lens sector being different from the volume of the second tear lens sector corrects a coma of the eye.

The ability of the soft contact lenses described herein to be able to mask astigmatism and coma can provide an advantage over many commercially available astigmatism-masking toric contact lenses. While such toric lenses can provide different refractive powers between the vertical and horizontal planes, they may not provide different refractive power within the same vertical or horizontal plane. By contrast, the soft contact lenses provided herein may have multiple sectors, the volume of the tear lens under each sector may be different, and the combination of each sector and tear lens portion directly posterior to its respective sector may provide different refractive power. As further discussed herein, the soft contact lenses described herein may mask astigmatism and coma independently of rotational orientation, while such toric lens require wear in a particular rotational orientation to mask astigmatism.

In another aspect, the present disclosure provides a method for correcting an ocular refractive error of the eye including the step of providing optical correction to an eye of a subject with an optical region of a soft contact lens and a free volume between a posterior surface of the lens and a corneal surface when positioned on the eye. In some embodiments, the at least one discontinuity of the soft contact lens allows tear fluid to flow into the free volume to form a tear lens over an ocular abnormality to correct an ocular refractive error of the eye.

In another aspect, the present disclosure provides a method for forming a tear lens including the step of applying to an eye a soft contact lens having a continuous body so as to form a free volume between a posterior surface of the continuous body and a corneal surface of the eye. In some embodiments, the at least one discontinuity of the soft contact lens allows tear fluid to flow into the free volume to form a tear lens over an ocular abnormality to correct an ocular refractive error of the eye.

In some embodiments, the soft contact lens is applied to the eye in any orientation such that the lens corrects the ocular refractive error of the eye irrespective of the orientation of the lens to a meridian of eye.

In some embodiments, the soft contact lens has a rigidity range from about $1.25E+04$ MPa*$\mu m^3$ to about $5.00E+08$ MPa*$\mu m^3$.

In some embodiments, the ocular refractive error originates from one or more of a corneal irregularity, coma, astigmatism, or higher order aberration of the eye.

In some embodiments, the ocular refractive error is an astigmatism of the eye.

In some embodiments, one or both of an anterior surface of the lens or a posterior surface of the lens is axially symmetric.

In some embodiments, an optical region of the lens has a uniform thickness.

In some embodiments, an optical region of the lens has a non-uniform thickness.

In some embodiments, the soft contact lens is made of a single material.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings (also "Figure" and "FIG." herein), of which:

DETAILED DESCRIPTION

Figure 1A:
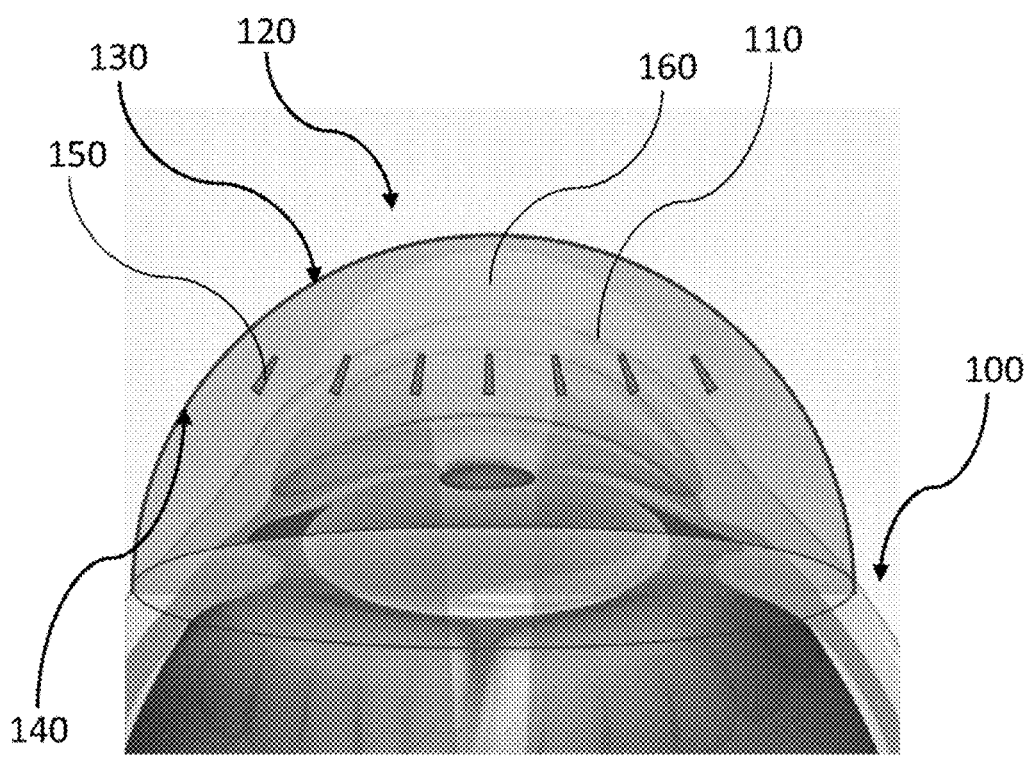
FIGS. 1A-1B are schematic illustrations showing a side sectional view of an embodiment of the soft contact lens of the present disclosure having a plurality of fenestrations, the soft contact lens positioned or disposed over a corneal surface of the eye.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments, however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Unless otherwise defined, all technical terms used herein have the same meaning as commonly understood by one of ordinary skill in the art to which this disclosure belongs. As used herein, the singular forms "a," "an," and "the" include plural references unless the context clearly indicates otherwise. Any reference to "or" herein is intended to encompass "and/or" unless otherwise stated. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present disclosure.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than," "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points.

For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Many of the features of the present disclosure are described in relation to the anatomy of the eye of a subject. The eye includes several tissues that allow a subject to see. The subject may be an animal. The subject may be a human, such as a patient. The cornea of the eye is an anterior region of the eye that is clear in healthy eyes and refracts light to form an image on the retina. The retina is a posterior region of the eye that senses light from the image formed thereon and transmits signals from the image to the brain. The cornea includes an outer layer of tissue, the epithelium, which protects the underlying tissues of the cornea, such as Bowman's membrane, the stroma and nerve fibers that extend into the stroma and Bowman's membrane. A healthy eye includes a tear film disposed over the epithelium. The tear film can smooth small irregularities of the epithelium to provide an optically-smooth surface. The tear film is shaped substantially by the shape of the underlying epithelium, stroma, and Bowman's membrane, if present. The tear film comprises a liquid that is mostly water but also includes additional components, such as mucoids and lipids. The many nerve fibers of the cornea provide sensation to promote blinking that can cover the cornea with the tear film. The never fibers also sense pain so that a subject will normally avoid trauma to the cornea and also avoid direct contact of an object to the cornea.

The embodiments described herein can be used to treat eye in many ways using one or more coverings. The coverings may comprise contact lenses. The coverings may be soft contact lens. The coverings and/or contact lenses may be capable of masking astigmatism and may be used to treat the same. Such contact lenses may comprise one or more astigmatism-masking contact lenses. The contact lenses may come in various versions. The coverings may comprise one or more soft lenses which may fit normally. In some cases, the contact lenses may be used for long-term vision correction with extended wear. The contact lenses may be used to treat astigmatism. In other examples, the coverings and/or contact lenses may be used in combination with or after surgery for improved results and/or recovery.

Unlike toric soft contact lenses, that require stabilization to position the correcting cylinder at the appropriate axis, the lenses of the present disclosure generally do not require stabilization. Accordingly, the lenses of the present disclosure may not have a mechanism for stabilizing the rotation of the lens to a particular cylinder of the eye. Further, the lenses of the present disclosure may not have orientation features or indicia (e.g., off-color markings on or within the contact lens body, one or more truncations of the peripheral edge of the contact lens body, an asymmetrical shape of the contact lens body, and the like) for stabilizing the rotation of the lens to a particular cylinder of the eye. For example, the lenses of the present disclosure may not include a prism-ballast (thickness differences across the lens profile that determine the lens rotation orientation) or periballast (i.e., bal-flange). Further the lenses of the present disclosure may not have non-prism ballast features such as a thin-zone, double-slab-off, or dynamic stabilization.

In some embodiments, the soft contact lens may correct or mask an ocular refractive error of the eye. The ocular refractive error may include one or more of a corneal irregularity, coma, astigmatism, or higher order aberration of the eye.

In some embodiments, the soft contact lenses may correct (i.e., mask) an ocular refractive error or aberration of the eye by at least about 20%, 30%, 40%, 50%, 60%, 65%, 70%, 75%, 80%, 85%, 90%, 95%, 99%, or more. In some embodiments, the optical aberration of the eye is a first order aberration or spherical aberration. In some embodiments, the optical aberration of the eye is a second order aberration or cylindrical aberration. In some embodiments, the optical aberration is a third order aberration or coma.

In some embodiments, the soft contact lenses may correct (i.e., mask) an astigmatism by at least about 20%, 30%, 40%, 50%, 60%, 65%, 70%, 75%, 80%, 85%, 90%, 95%, 99%, or more. For example, a soft contact lens may mask astigmatism up to 1 D. In some examples, the soft contact lens may also mask an astigmatism up to 2 D. In other examples, the soft contact lens may also mask an astigmatism up to 3 D. The soft contact lenses may mask astigmatism by an amount that is within a range defined by any two of the preceding values.

In some cases, correcting an ocular refractive error or aberration of the eye comprises masking a 1 millimeter (mm), 2 mm, 3 mm, 4 mm, 5 mm, 6 mm, 7 mm, 8 mm, 9 mm, 10 mm, 11 mm, 12 mm, or larger diameter of the corneal surface. In some examples, masking an ocular refractive error or aberration of the eye comprises masking about a 12 mm, 11 mm, 10 mm, 9 mm, 8 mm, 7 mm, 6 mm, 5 mm, 4 mm, 3 mm, 2 mm, 1 mm, or smaller diameter of the corneal surface. The ocular refractive error or aberration of the eye may have an area within a range defined by any two of the preceding values. For example, the ocular refractive error or aberration of the eye may have an area between about 9 mm and about 8 mm of the central diameter of the cornea.

In some cases, correcting an astigmatism comprises masking a 1 millimeter (mm), 2 mm, 3 mm, 4 mm, 5 mm, 6 mm, 7 mm, 8 mm, 9 mm, 10 mm, 11 mm, 12 mm, or larger diameter of the corneal surface. In some examples, masking an astigmatism comprises masking about a 12 mm, 11 mm, 10 mm, 9 mm, 8 mm, 7 mm, 6 mm, 5 mm, 4 mm, 3 mm, 2 mm, 1 mm, or smaller diameter of the corneal surface. The astigmatic area may be within a range defined by any two of the preceding values. For example, the astigmatic area may be between about 9 mm and about 8 mm of the central diameter of the cornea.

In some cases, the soft contact lenses may reduce stock keeping unit (SKU) requirements by at least about 30%, 40%, 50%, 60%, 70%, 80%, 90%, 95%, 99%, or more compared to soft toric contact lenses or other conventional contact lenses. In some cases, the soft contact lenses may reduce SKU requirements by at most about 99%, 95%, 90%, 80%, 70%, 60%, 50%, or less compared to soft toric contact lenses or other conventional contact lenses. For example, a soft contact lens provided herein may reduce SKUs requirements by up to about 95%. The contact lenses may reduce SKU requirements by an amount that is within a range defined by any two of the preceding values.

In some embodiments, the soft contact lens may also reduce the required fitting time or chair time at the eye care professional or the number of visits until the final lens fit is determined.

Figure 4A:
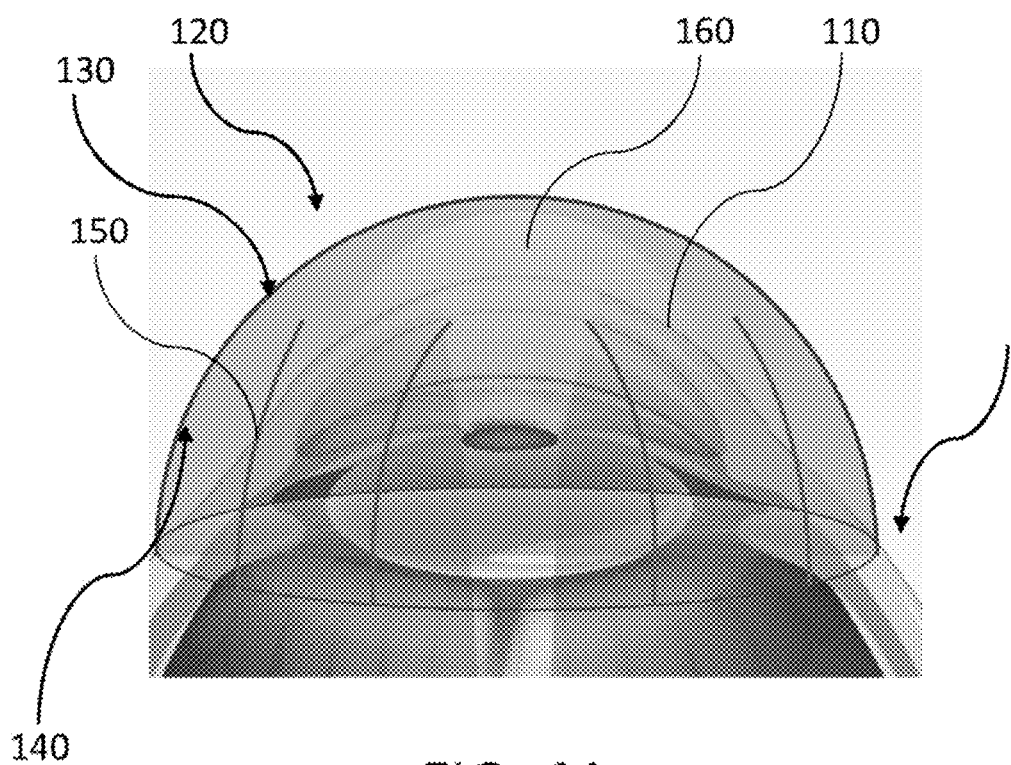
FIGS. 4A-4B are schematic illustrations showing a side sectional view of an embodiment of the soft contact lens of the present disclosure having a plurality of radial channels, the soft contact lens positioned or disposed over a corneal surface of the eye.
Figure 4B:
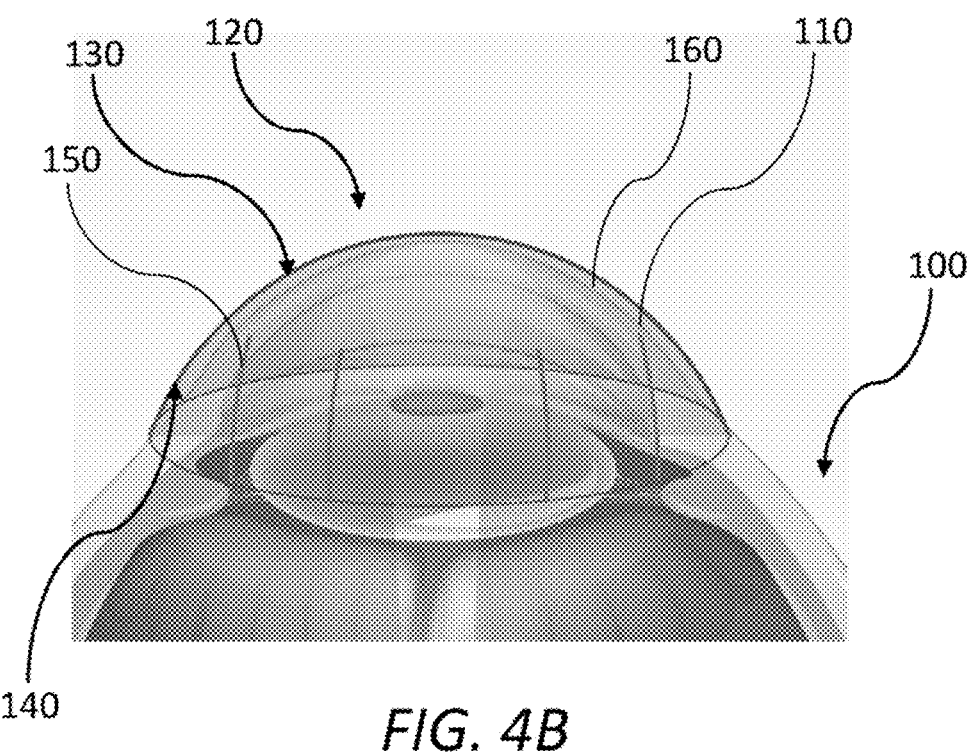
Figure 5A:
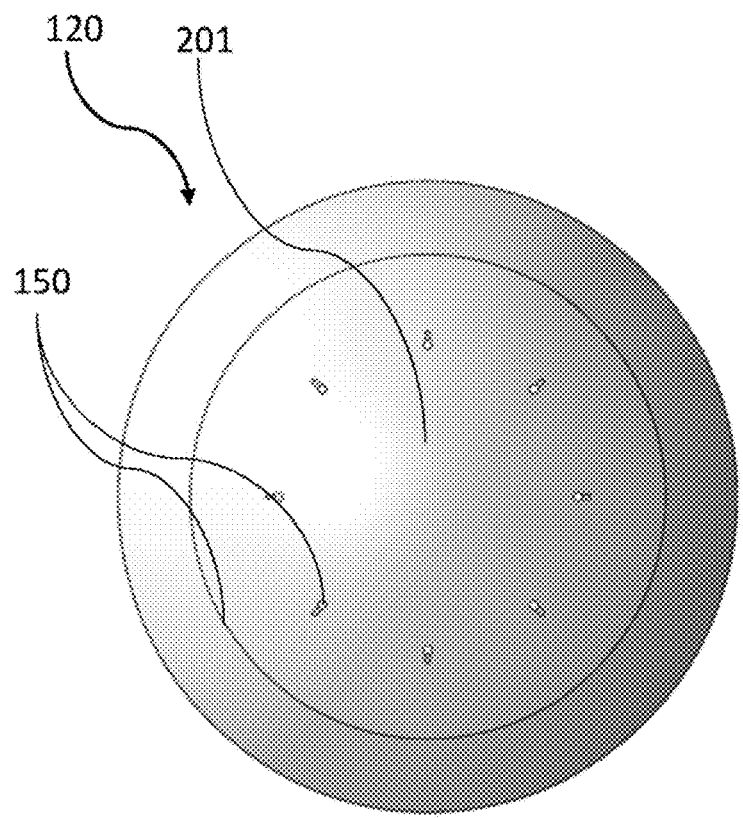
FIGS. 5A and 5B are illustrations showing perspective views, top-down, of the soft contact lenses of the present disclosure, according to some embodiments.
Figure 5B:
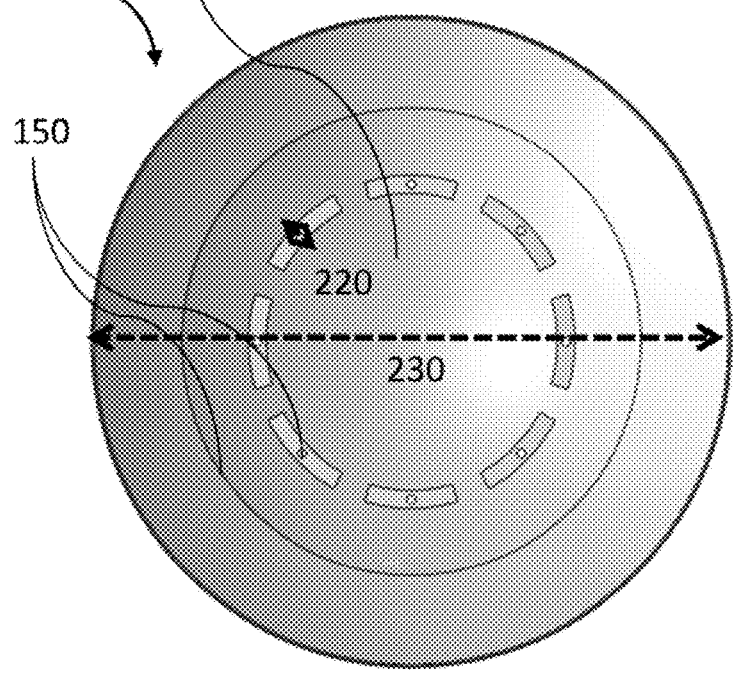
Figure 6:
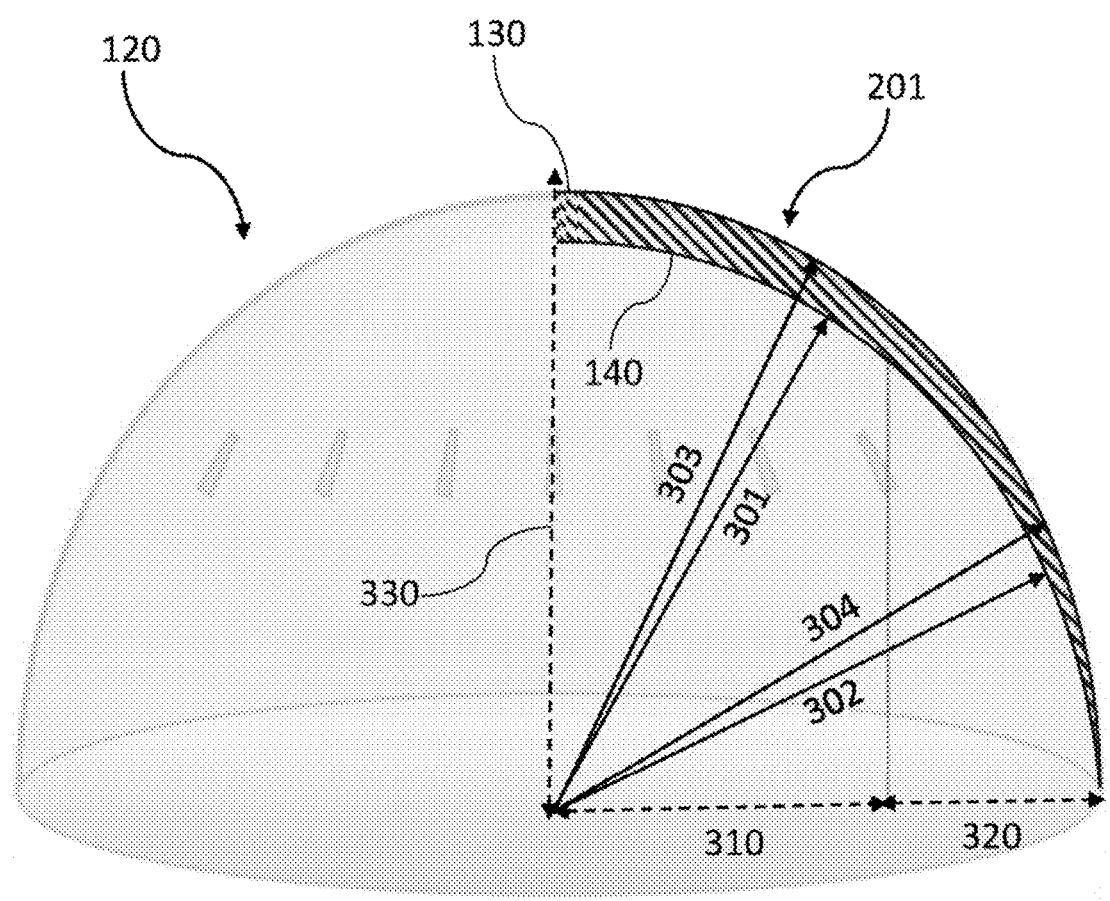
FIG. 6 is a schematic illustration showing a side sectional view of an exemplary soft contact lens, according to some embodiments.

Provided herein are soft contact lenses which may be used to correct an ocular refractive error of the eye. The ocular refractive error may be an astigmatism of the eye. A side sectional view of various exemplary soft contact lens 120 positioned or disposed over a corneal surface 110 of the eye 100 is schematically illustrated in FIGS. 1A-4B. A top-down three-dimensional ("3D") views of the soft contact lens 120 are shown in FIGS. 5A-5B. A 3D side sectional view and a corresponding cross-section of the soft contact lens 120 providing its dimensions is shown in FIG. 6.

FIGS. 1A-4B show a side sectional view of a covering 120 positioned or disposed on an eye 100 of a subject. The covering 120 may comprise or be a soft contact lens. The eye 100 comprises a corneal surface 110 and an eye lens configured to form an image on the retina (not shown). The covering 120 may, for example, be configured to correct or mask an astigmatism of the eye 100. The covering may comprise a soft continuous lens body.

In some cases, the contact lens for correcting a refractive error may have a continuous body. In some cases, the continuous body does not have a juncture (e.g., a living hinge). In some cases, the continuous body comprises a substantially uniform material, a substantially uniform rigidity, a substantially uniform tensile modulus, a substantially uniform tensile stress, or a substantially similar cross-sectional thickness at and near a transition, or a combination thereof. In some cases, a continuous body refers to the lens having little to no difference in thickness, modulus, and/or rigidity at or near a transition. In some cases, a continuous body refers to having a substantially smooth surface along one more axis or line from the center of the lens to the periphery of the lens.

The continuous lens body may comprise an anterior surface 130, a posterior surface 140, and at least one discrete discontinuity 150 on the soft continuous lens body. Either the anterior surface 130, the posterior surface 140, or both, of the covering 120 may be axially symmetric when the covering 120 is in a neutral configuration (for instance, when the covering 120 is not placed on any eye or other surface, for instance, when the covering 120 is placed and/or stored in a contact lens solution). Either the anterior surface 130, the posterior surface 140, or both, of the covering 120 may be rotationally symmetric when the covering 120 is disposed on an eye 100 of a subject. Either the anterior surface 130, the posterior surface 140, or both, of the covering 120 may be rotationally symmetric such that the covering 120 has the has the same radius of curvature throughout regardless of the meridian of the eye, reducing the need for precise rotational stabilization or orientation of the covering 120. In some embodiments, the continuous lens body of the covering 120 may further comprise a lens volume defined by a volume between the anterior surface 130 and the posterior surface 140. In some embodiments, the lens volume is axially symmetric. In some embodiments, the lens volume is rotationally symmetric.

At least a portion of the continuous lens body may be configured to conform to astigmatism or higher order aberration. At least a portion of the continuous lens body may be configured to conform to the meridians of the eye 100 so that there may be only a negligible difference between the sphericity of the corneal surface 110 and the sphericity of the peripheral continuous body. For example, at least one sector of the soft continuous lens body from a center of the soft continuous lens body to a peripheral edge of the soft continuous lens body is configured to be suspend over the corneal surface 110 of the eye 100. The at least a portion of the posterior surface 140 of the continuous lens body may be configured to be suspended above the corneal surface 110 of the eye 100 forming a free volume 160 between the posterior surface 140 of the continuous lens body and the corneal surface 110. For example, any of the at least one sector of the soft continuous lens body is capable of being suspended over the corneal surface 110 to form at least a portion of the free volume 160 when the continuous lens body is disposed over the corneal surface 110. At least a portion of the free volume 160 may be configured to be filled with a fluid, such as, for example tear fluid or artificial tear fluid, to form a tear lens over the corneal surface 110 for correcting an ocular refractive error of the eye. At least a portion of the free volume 160 may be configured to be filled with a fluid to form a tear lens over the corneal surface 110 for correcting an astigmatism of the eye.

Figure 1B:
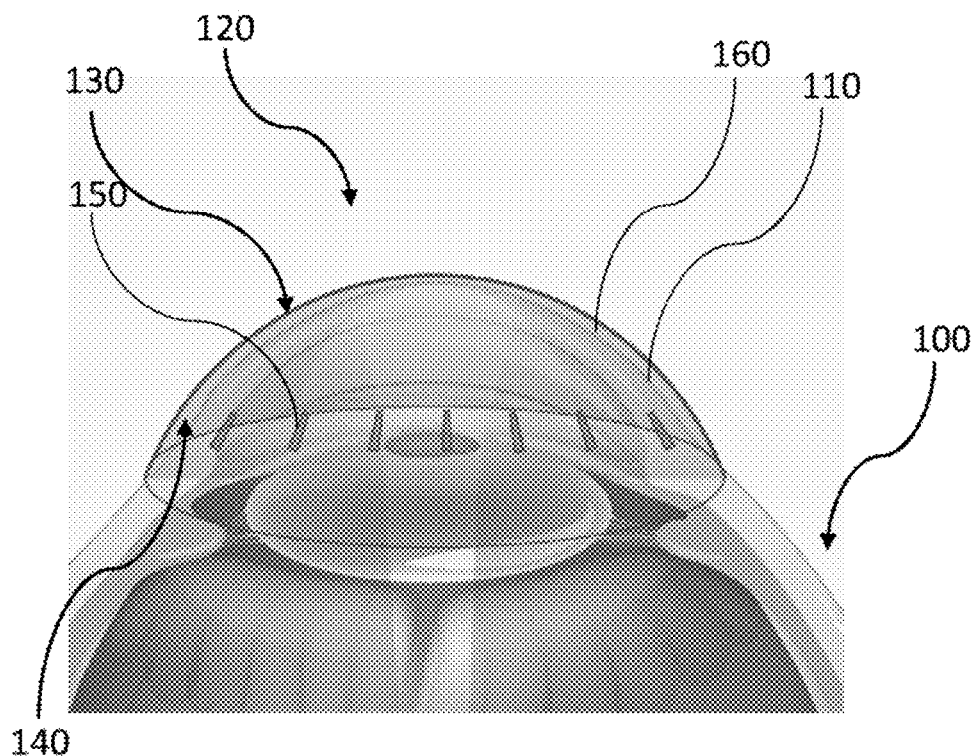
Figure 2A:
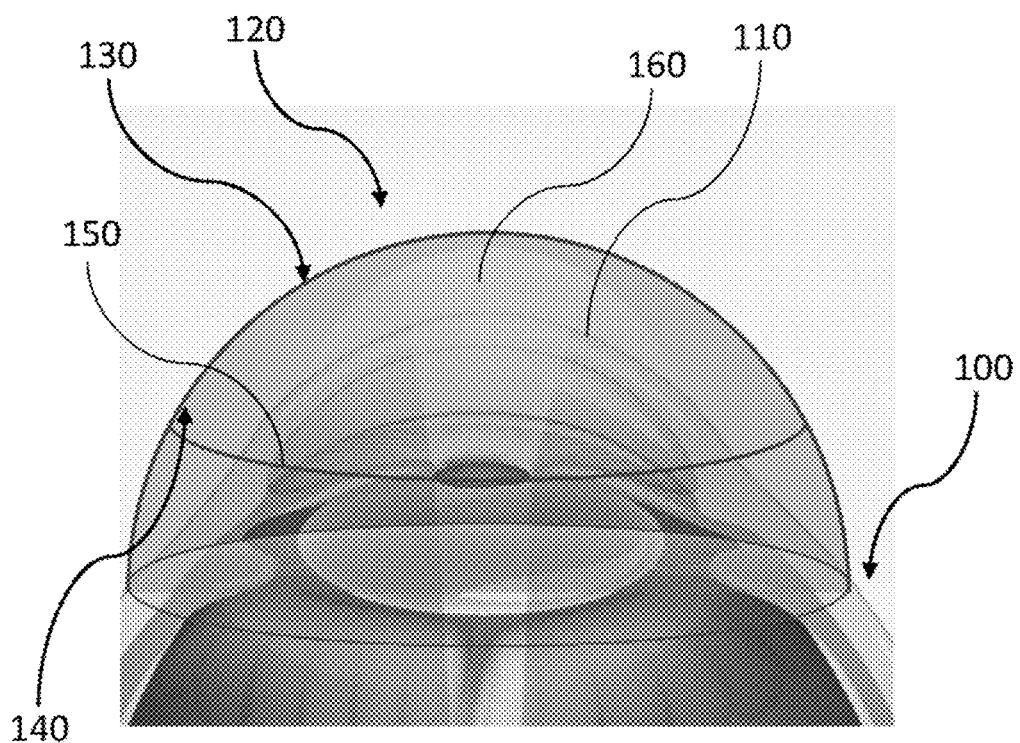
FIGS. 2A-2B are schematic illustrations showing a side sectional view of an embodiment of the soft contact lens of the present disclosure having a circumferential groove, the soft contact lens positioned or disposed over a corneal surface of the eye.
Figure 2B:
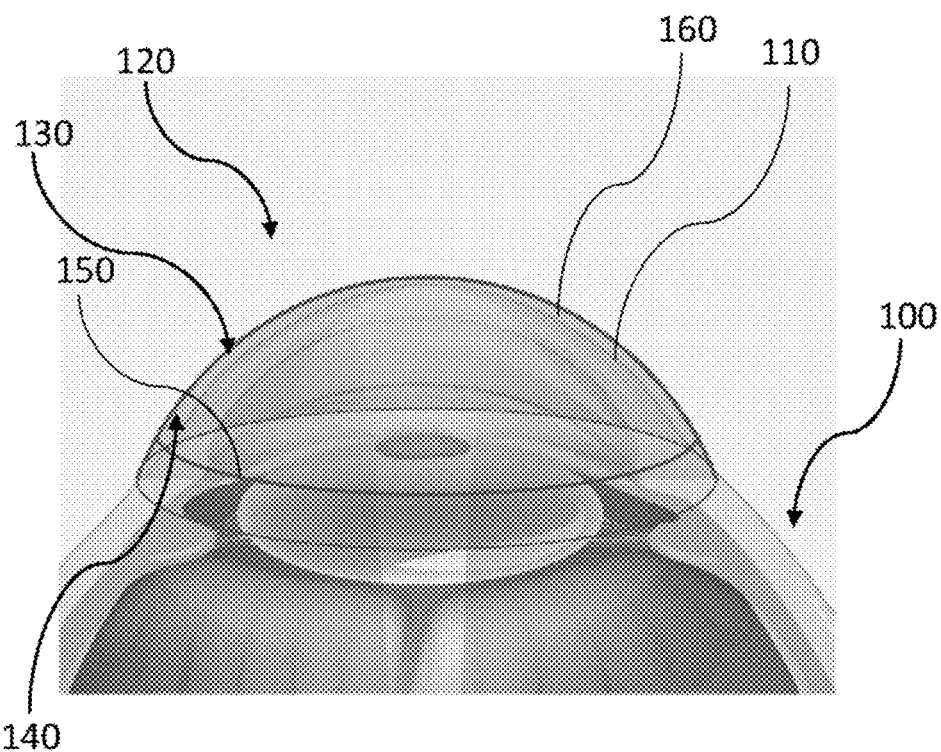

The continuous lens body of the covering 120 may comprise at least one discrete discontinuity 150 disposed on either the anterior surface 130, the posterior surface 140, or both. The at least one discrete discontinuity may span a given circumference of the covering 120, as shown in FIGS. 2A-2B. The at least one discontinuity 150 may span only discrete portions of a given circumference, as shown in FIGS. 1A-1B and 4A-4B. The at least one discrete discontinuity 150 may be positioned radially (i.e., directed away from the center of the continuous lens body), as shown in FIGS. 4A-4B. The at least one discrete discontinuity 150 may be positioned both circumferentially and radially (i.e., on some meridians the at least one discrete discontinuity 150 is positioned circumferentially, and on some meridians the at least one discrete discontinuity 150 is positioned radially). The at least one discrete discontinuity 150 may be uniformly disposed about a given circumference of the continuous body. The at least one discrete discontinuity 150 may be non-uniformly disposed about a given circumference of the continuous body. The at least one discrete discontinuity 150 may have a different thickness than the continuous lens body.

The at least one discontinuity 150 may be thin portion of the continuous lens body, such as single groove, multiple grooves, a single thin region, multiple thin regions, a single living hinge, multiple living hinges, a single partially disconnected segment, multiple partially disconnected segments, and/or one or more other mechanically weakened or disconnected segments. The thin portion may (i.e., groove) may reduce mechanical distortion of the continuous lens body. FIGS. 2A-2B shows an embodiment of the covering 120 of the present disclosure where the at least one discontinuity 150 is a circumferential groove. In some embodiments, at least a portion of the continuous lens body is configured to conform to the corneal surface 110 forming a deformation of the continuous lens body. In some embodiments, the at least one discontinuity 150 is further configured to substantially prevent translation of the deformation to a non-conforming portion of the soft continuous lens body, such as, for example, an optical region of the continuous lens body.

The at least one discontinuity 150 may include fenestrations, slits, openings, thinning, or any other feature or combination of features that would cause a local reduction in the rigidity of the covering 120, or any other manipulation of the covering material or its geometry that would reduce the force transfer between a conforming and a non-conforming portion of the continuous lens body. FIGS. 1A-1B shows an embodiment of the covering 120 of the present disclosure where the at least one discontinuity 150 is a plurality of fenestrations. The at least one discontinuity 150 may be fenestrations, pooling areas, radial channels, or a circumferential channel, or combinations thereof, that can facilitate fluid flow from the anterior surface 130 across the posterior surface 140. The at least one discontinuity 150 may be fenestrations, pooling areas, radial channels, or a circumferential channel, or combinations thereof, that can facilitate fluid flow from a peripheral edge of the continuous lens body to an area central to the continuous lens body. The at least one discrete discontinuity 150 may allow a fluid to flow into and out of the free volume 160. The at least one discontinuity 150 may traverse the continuous lens body in any direction. FIGS. 4A-4B show an embodiment of the covering 120 of the present disclosure where the at least one discontinuity 150 is a plurality of radial channels.

The at least one discontinuity 150 may have any cross-sectional geometry including square, rectangular, circular, semi-circular, curved, triangular, or any other geometrical shape. The at least one discontinuity 150 may define the area of the ocular refractive error or optical aberration masked, or from which the ocular refractive error or optical aberration is reduced relative to the corneal ocular refractive error or optical aberration. The area of the ocular refractive error or optical aberration defined by the at least one discontinuity 150 may contain ocular refractive error or optical aberration, such as an astigmatism or coma.

The continuous lens body of the covering 120 may comprise one or more optical regions and one or more non-optical regions. The at least one discrete discontinuity 150 may be positioned away from the center of the one or more optical regions. The at least one discrete discontinuity 150 may be at least about 1 millimeters (mm), 1.2 mm, 1.4 mm, 1.6 mm, 1.8 mm, 2 mm, 2.2 mm, 2.4 mm, 2.6 mm, 2.8 mm, 3 mm, 3.2 mm, 3.4 mm, 3.6 mm, 3.8 mm, 4 mm, 4.2 mm, 4.4 mm, 4.6 mm, 4.8 mm, 5 mm, 5.2 mm, 5.4 mm, 5.6 mm, 5.8 mm, 6 mm, 6.2 mm, 6.4 mm, 6.6 mm, 6.8 mm, 7 mm, 7.2 mm, 7.4 mm, 7.6 mm, 7.8 mm, 8 mm, 8.2 mm, 8.4 mm, 8.6 mm, 8.8 mm, 9 mm or more, away from the center of the one or more optical regions of the continuous lens body. In some examples, The at least one discrete discontinuity 150 may be at most about 9 mm, 8.8 mm, 8.6 mm, 8.4 mm, 8.2 mm, 8 mm, 7.8 mm, 7.6 mm, 7.4 mm, 7.2 mm, 7 mm, 6.8 mm, 6.6 mm 6.4 mm, 6.2 mm, 6 mm, 5.8 mm, 5.6 mm, 5.4 mm, 5.2 mm, 5 mm, 4.8 mm, 4.6 mm, 4.4 mm, 4.2 mm, 4 mm, 3.8 mm, 3.6 mm, 3.4 mm, 3.2 mm, 3 mm, 2.8 mm, 2.6 mm, 2.4 mm, 2.2 mm, 2 mm, 1.8 mm, 1.6 mm, 1.4 mm, 1.2 mm, 1 mm, or less, away from the center of the one or more optical regions of the continuous lens body. The at least one discrete discontinuity 150 may be located a distance away from the center of the one or more optical regions that may be within a range defined by any two of the preceding values. For instance, the at least one discrete discontinuity 150 may be located from about 1 mm to about 9 mm away from the center of the one or more optical regions of the continuous lens body. In an example, the at least one discrete discontinuity 150 is about 1-7 mm away from the center of the one or more optical regions the continuous lens body.

The portion of the posterior surface 140 that is suspended over the corneal surface 110 forms the free volume 160. The free volume 160, may act as a chamber. The chamber may be configured to store a fluid, such as tears or artificial tears, which may keep the eye 100 or a surface thereof moist and prevent the eye from dehydrating. The fluid filled chamber may add to the comfort of the covering 120 while it is in use. The free volume 160 may also be configured to form a tear lens over the corneal surface 110. In some embodiments, the free volume 160 may provide an optical power to the subject when placed on the eye 100. In some embodiments, the free volume 160 may not provide an optical power when placed on the eye 100.

The free volume 160 between at least a portion of the posterior surface 140 and the corneal surface 110 may have a total volume from about 0.001 microliters ("µL") to about 10 µL. The free volume 160 may have a total volume of at least about 0.001 µL, 0.002 µL, 0.003 µL, 0.004 µL, 0.005 µL, 0.006 µL, 0.007 µL, 0.008 µL, 0.009 µL, 0.01 µL, 0.02 µL, 0.04 µL, 0.06 µL 0.08 µL, 0.1 µL, 0.3 µL, 0.6 µL, 0.9 µL, 1 µL, 2 µL, 3 µL, 4 µL, 5 µL, 6 µL, 7 µL, 8 µL, 9 µL, 10 µL, or any values therebetween. The free volume 160 may have a total volume of at most about 10 µL, 9 µL, 8 µL, 7 µL, 6 µL, 5 µL, 4 µL, 3 µL, 2 µL, 1 µL, 0.9 µL, 0.6 µL, 0.3 µL, 0.1 µL, 0.08 µL, 0.06 µL, 0.06 µL, 0.04 µL, 0.02 µL, 0.01 µL, 0.009 µL, 0.008 µL, 0.007 µL, 0.006 µL, 0.005 µL, 0.004 µL, 0.003 µL, 0.002 µL, 0.001 µL, or any values there between. The free volume 160 may have a total volume within a range defined by any two of the preceding values.

FIGS. 2A and 2B show perspective views of a covering 120. FIG. 5A shows an anterior surface 130 of the covering 120, and FIG. 5B shows a posterior surface 140 of the covering 120. The covering 120 shown in FIGS. 5A and 5B may be substantially similar to any of the coverings descried herein. The continuous lens body 201 of the covering 120 may have at least one discrete discontinuity 150. The at least one discrete discontinuity may promote a fluid, such as tears or artificial tears, to flow into and out of the free volume 160, such as, for example, when the eye 100 blinks. This may create a tear film on the covering 120 (e.g., lens) and/or on the eye 100 which may make the covering 120 more comfortable to the wearer. Additionally, the free volume 160 may fill with fluids providing mechanical support to the vaulted regions of the continuous lens body 201 of the covering 120 and may reduce the effective astigmatism of the eye 100.

The at least one discrete discontinuity 150 may be positioned on any portion of the anterior surface 130 of the covering 120. The at least one discrete discontinuity 150 may be at least about 3 millimeters (mm), 3.1 mm, 3.2 mm, 3.3 mm, 3.4 mm, 3.5 mm, 3.6 mm, 3.6 mm, 3.7 mm, 3.8 mm, 3.9 mm, 4 mm, 4.1 mm, 4.2 mm, 4.3 mm, 4.4 mm, 4.5 mm, 4.6 mm, 4.7 mm, 4.8 mm, 4.9 mm, 5 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, 6.3 mm, 6.4 mm, 6.5 mm, 6.6 mm, 6.7 mm, 6.8 mm, 6.9 mm, 7 mm, 7.1 mm, 7.2 mm, 7.3 mm, 7.4 mm, 7.5 mm 7.6 mm, 7.7 mm, 7.8 mm, 7.9 mm, 8 mm, 8.1 mm, 8.2 mm, 8.3 mm, 8.4 mm, 8.5 mm, 8.6 mm, 8.7 mm, 8.8 mm, 8.9 mm, 9 mm, or more, away from the center of anterior surface 130 of the covering 120. In some examples, the at least one discrete discontinuity 150 may be at most about 9 mm, 8.9 mm, 8.8 mm, 8.7 mm, 8.6 mm, 8.5 mm, 8.4 mm, 8.3 mm, 8.2 mm, 8.1 mm, 8 mm, 7.9 mm, 7.8 mm, 7.7 mm, 7.6 mm, 7.5 mm, 7.4 mm, 7.3 mm, 7.2 mm, 7.1 mm, 7 mm, 6.9 mm, 6.8 mm, 6.7 mm, 6.6 mm, 6.5 mm, 6.4 mm, 6.3 mm, 6.2 mm, 6.1 mm, 6 mm, 5.9 mm, 5.8 mm, 5.7 mm, 5.6 mm, 5.5 mm, 5.4 mm, 5.3 mm, 5.2 mm, 5.1 mm, 5 mm, 4.9 mm, 4.8 mm, 4.7 mm, 4.6 mm, 4.5 mm, 4.4 mm, 4.3 mm, 4.2 mm, 4.1 mm, 4 mm, 3.9 mm, 3.8 mm 3.7 mm, 3.6 mm, 3.5 mm, 3.4 mm, 3.3 mm, 3.2 mm, 3.1 mm, 3 mm, or less, away from the center of the anterior surface 130 of the covering 120. The at least one discrete discontinuity 150 may be located a distance away from the center of anterior surface 130 that may be within a range defined by any two of the preceding values. For instance, the at least one discrete discontinuity 150 may be located from about 3 mm to about 9 mm away from the center of the anterior surface 130 of the covering 120. In an example, at least one discrete discontinuity 150 is about 5 mm away from the center of the anterior surface 130. In the example, the at least one discrete discontinuity 150 may be from about 1 mm to about 8 mm away from the center of the anterior surface 130. For example, the at least one discrete discontinuity 150 may be about 3-8 mm away from the center of the anterior surface 130. The at least one discrete discontinuity may be positioned on any portion of both the anterior surface 130 and the posterior surface 140.

The at least one discrete discontinuity 150 may be positioned on any portion of the posterior surface 140 of the covering 120. The at least one discrete discontinuity 150 may be at least about 3 millimeters (mm), 3.1 mm, 3.2 mm, 3.3 mm, 3.4 mm, 3.5 mm, 3.6 mm, 3.6 mm, 3.7 mm, 3.8 mm, 3.9 mm, 4 mm, 4.1 mm, 4.2 mm, 4.3 mm, 4.4 mm, 4.5 mm, 4.6 mm, 4.7 mm, 4.8 mm, 4.9 mm, 5 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, 6.3 mm, 6.4 mm, 6.5 mm, 6.6 mm, 6.7 mm, 6.8 mm, 6.9 mm, 7 mm, 7.1 mm, 7.2 mm, 7.3 mm, 7.4 mm, 7.5 mm 7.6 mm, 7.7 mm, 7.8 mm, 7.9 mm, 8 mm, 8.1 mm, 8.2 mm, 8.3 mm, 8.4 mm, 8.5 mm, 8.6 mm, 8.7 mm, 8.8 mm, 8.9 mm, 9 mm, or more, away from the center of posterior surface 140 of the covering 120. In some examples, the at least one discrete discontinuity 150 may be at most about 9 mm, 8.9 mm, 8.8 mm, 8.7 mm, 8.6 mm, 8.5 mm, 8.4 mm, 8.3 mm, 8.2 mm, 8.1 mm, 8 mm, 7.9 mm, 7.8 mm, 7.7 mm, 7.6 mm, 7.5 mm, 7.4 mm, 7.3 mm, 7.2 mm, 7.1 mm, 7 mm, 6.9 mm, 6.8 mm, 6.7 mm, 6.6 mm, 6.5 mm, 6.4 mm, 6.3 mm, 6.2 mm, 6.1 mm, 6 mm, 5.9 mm, 5.8 mm, 5.7 mm, 5.6 mm, 5.5 mm, 5.4 mm, 5.3 mm, 5.2 mm, 5.1 mm, 5 mm, 4.9 mm, 4.8 mm, 4.7 mm, 4.6 mm, 4.5 mm, 4.4 mm, 4.3 mm, 4.2 mm, 4.1 mm, 4 mm, 3.9 mm, 3.8 mm 3.7 mm, 3.6 mm, 3.5 mm, 3.4 mm, 3.3 mm, 3.2 mm, 3.1 mm, 3 mm, or less, away from the center of the posterior surface 140 of the covering 120. The at least one discrete discontinuity 150 may be located a distance away from the center of posterior surface 140 that may be within a range defined by any two of the preceding values. For instance, the at least one discrete discontinuity 140 may be located from about 3 mm to about 9 mm away from the center of the posterior surface 140 of the covering 120. In the example, the at least one discrete discontinuity 150 may be from about 1 mm to about 8 mm away from the center of the posterior surface 140. For example, the at least one discrete discontinuity 150 may be about 3-8 mm away from the center of the posterior surface 140.

Locating the at least one discrete discontinuity 150 away from the center of either the anterior surface 130 or posterior surface 140 may help to decrease potential optical artifacts which, in some cases may be caused by the at least one discrete discontinuity 150.

In some examples, a characteristic dimension (such as a length, width, height or diameter) of the at least one discrete discontinuity 150 may be at least about 0.01 mm, 0.02 mm, 0.03 mm, 0.04 mm, 0.05 mm, 0.06 mm, 0.07 mm, 0.08 mm, 0.09 mm, 0.1 mm, 0.2 mm, 0.3 mm, 0.4 mm, 0.5 mm, 0.6 mm, 0.7 mm, 0.8 mm, 0.9 mm, 1 mm, or more. In some examples, a characteristic dimension of the at least one discrete discontinuity 150 may be at most about 1 mm, 0.9 mm, 0.8 mm, 0.7 mm, 0.6 mm, 0.5 mm, 0.4 mm, 0.3 mm, 0.2 mm, 0.1 mm, 0.09 mm, 0.08 mm, 0.07 mm, 0.06 mm, 0.5 mm, 0.04 mm, 0.03 mm, 0.02 mm, 0.01 mm, or less. A characteristic dimension of the at least one discrete discontinuity 150 may be within a range defined by any two of the preceding values. For instance, a characteristic dimension of the at least one discrete discontinuity 150 may be within a range from about 0.01 mm to about 1 mm, from about 0.05 mm to about 1 mm, or from about 0.05 mm to about 0.5 mm. The at least one discontinuity 150 may be non-uniform in their shape and dimension. For example, the covering 120 may comprise a plurality of radial channels having a characteristic length from about 0.1 to about 4 mm, and further comprise a plurality of fenestrations having a characteristic diameter from 0.01 mm to about 4 mm, and further comprise at least one circumferential groove having a characteristic width from about 0.01 mm to about 1 mm.

The dimensions of an exemplary covering are shown in FIGS. 5A-5B. The at least one discrete discontinuity 150 of the covering 120 may comprise a diameter 220 (for instance, the length between the outer and inner diameters of the at least one discrete discontinuity 150). The diameter 220 of the at least one discrete discontinuity 150 may be less than about 2000 micrometers (μm). In some examples, the diameter 220 of the at least one discrete discontinuity 150 may be at most about 2000 μm, 1900 μm, 1800 μm, 1700 μm, 1600 μm, 1500 μm, 1400 μm, 1300 μm, 1200 μm, 1100 μm, 1000 μm, 900 μm, 800 μm, 700 μm, 600 μm, 500 μm, 400 μm, 300 μm, 200 μm, 100 μm, 50 μm, 10 μm, 1 μm, or less. In some examples, the diameter 220 of the at least one discrete discontinuity 150 may be at least about 1 μm, 10 μm, 50 μm, 100 μm, 200 μm, 300 μm, 400 μm, 500 μm, 600 μm, 700 μm, 800 μm, 900 μm, 1000 μm, 1100 μm, 1200 μm, 1300 μm, 1400 μm, 1500 μm, 1600 μm, 1700 μm, 1800 μm, 1900 μm, 2000 μm, or more. In some cases, the diameter 220 of the at least one discrete discontinuity 150 may be about 1000 μm. The diameter 220 of the at least one discrete discontinuity 150 may be within a range defined by any two of the preceding values. For instance, the diameter 220 of the at least one discrete discontinuity 150 may be from about 1 μm mm to about 2000 μm.

In some embodiments, a covering comprises groove and/or fenestration that is smoothed. —In some embodiments, discrete discontinuities (e.g. grooves and fenestration) may comprise one or more edges which are at the transition between the anterior or posterior surface of the lens and the discrete discontinuity. In some embodiments, such edges comprise a geometry which may affect the function and/or comfort of the lens to an eye of a subject. In some embodiments, such edges may be radiused and soften the transition from a surface of the lens to the geometry of the features, thereby improving comfort of the contact lens. In some embodiments, in a covering without radiused edges, the features may comprise sharp corners (e.g. a vertex) which can irritate the eyelid and/or cornea. In some embodiments, a radiused edge may distribute the pressure of the lens on the eye over a wider (e.g., larger) area, allow for movement of the lens while minimizing friction with the cornea and/or eye lid. In some cases, radiused edges may comprise a radius of curvature from about 0.05 mm to about 1 mm, or more. In some cases, radiused edges may comprise a radius of curvature from about 0.05 mm to about 1 mm, or less. In some cases, radiused edges may comprise a radius of curvature that is 0.005 mm, 0.01 mm, 0.02 mm, 0.03 mm, 0.04 mm, 0.05 mm, 0.06 mm. 0.07 mm, 0.08 mm, 0.09, 0.1 mm, 0.11 mm, 0.12 mm, 0.13 mm, 0.14 mm, 0.15 mm, 0.16 mm, 0.17 mm 0.18 mm, 0.19 mm, 0.20 mm, 0.21 mm, 0.22 mm, 0.23 mm, 0.24 mm, 0.25 mm, 0.26 mm, 0.27 mm, 0.28 mm, 0.29 mm, 0.30 mm, 0.31 mm, 0.32 mm, 0.33 mm, 0.34 mm, 0.35 mm, 0.36 mm, 0.37 mm, 0.38 mm, 0.39 mm, 0.4 mm, 0.41 mm, 0.42 mm, 0.43 mm, 0.44 mm, 0.45 mm, 0.46 mm, 0.47 mm, 0.48 mm, 0.49 mm, 0.50 mm, 0.51 mm, 0.52 mm, 0.53 mm, 0.54 mm, 0.55 mm, 0.56 mm, 0.57 mm 0.58 mm, 0.59 mm, 0.6 mm, 0.61 mm, 0.62 mm, 0.63 mm, 0.64 mm, 0.65 mm, 0.66 mm, 0.67 mm, 0.68 mm, 0.69 mm, 0.70 mm, 0.71 mm, 0.72 mm, 0.73 mm, 0.74 mm, 0.75 mm, 0.76 mm, 0.77 mm, 0.738 mm, 0.79 mm, 0.8 mm, 0.81 mm, 0.82 mm, 0.83 mm, 0.84 mm, 0.85 mm, 0.86 mm, 0.87 mm, 0.88 mm, 0.89 mm, 0.90 mm, 0.91 mm, 0.92 mm, 0.93 mm, 0.94 mm, 0.95 mm, 0.96 mm, 0.97 mm, 0.98 mm, 0.99 mm, 1.00 m. In some embodiments, radiused edges may be uniform along the entire edge of the discrete discontinuity. In some embodiments, radiused edged comprise one or more different radii along the edge of the discrete discontinuity (e.g., larger radius in vertical meridian relative to the lid movement). In some embodiments, radiused edges comprise a progressively variable radius of curvature along the length of a groove. In some embodiments, radiused edges facilitate improved fluid flow through fenestration. In some embodiments, radiused edges may facilitate fluid flow along a groove.

The diameter 230 of the covering 120 may be at least about 8 mm, 8.5 mm, 9 mm, 9.5 mm, 10 mm, 10.5 mm, 11 mm, 11.5 mm, 12 mm, 12.5 mm, 13 mm, 13.1 mm, 13.2 mm, 13.3 mm, 13.4 mm, 13.5 mm, 13.6 mm, 13.7 mm, 13.8 mm, 13.9 mm, 14 mm, 14.1 mm, 14.2 mm, 14.3 mm, 14.4 mm, 14.5 mm, 14.6 mm, 14.7 mm, 14.8 mm, 14.9 mm, 15 mm, 15.1 mm, 15.2 mm, 15.3 mm, 15.4 mm, 15.5 mm, 15.6 mm, 15.7 mm, 15.8 mm, 15.9 mm, 16 mm, 16.1 mm, 16.2 mm, 16.3 mm, 16.4 mm, 16.5 mm, 16.6 mm, 16.7 mm, 16.8 mm, 16.9 mm, 17 mm, or more. In some examples, the diameter 230 of the covering 120 may be at most about 17 mm, 16.9 mm, 16.8 mm, 16.7 mm, 16.6 mm, 16.5 mm, 16.4 mm, 16.3 mm, 16.2 mm, 16.1 mm, 16 mm, 15.6 mm, 15.5 mm, 15.4 mm, 15.3 mm, 15.2 mm, 15.1 mm, 15 mm, 14.9 mm, 14.8 mm, 14.7 mm, 14.6 mm, 14.5 mm, 14.4 mm, 14.3 mm, 14.2 mm, 14.1 mm, 14 mm, 13.9 mm, 13.8 mm, 13.7 mm, 13.6 mm, 13.5 mm, 13.4 mm, 13.3 mm, 13.2 mm, 13.1 mm, 13 mm, 12.5 mm, 12 mm, 11.5 mm, 11 mm, 10.5 mm, 10 mm, 9.5 mm, 9 mm, 8.5 mm, 8 mm, or less. The diameter 230 of the covering 120 may be within a range defined by any two of the preceding values.

Figure 3A:
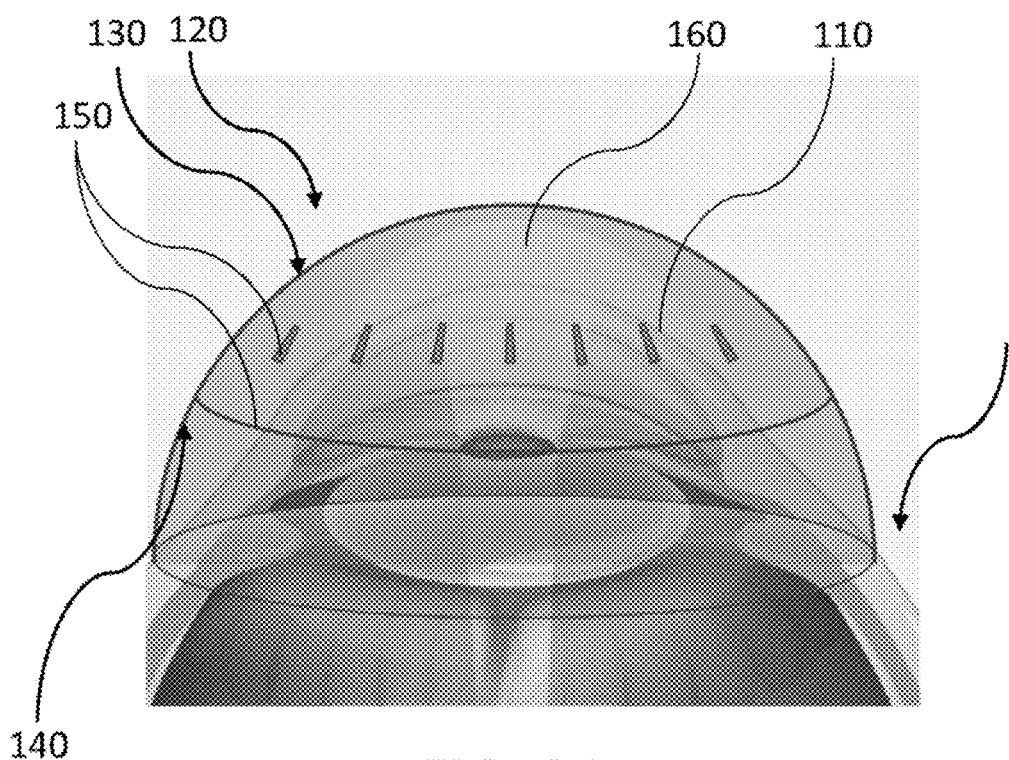
FIGS. 3A-3B are schematic illustrations showing a side sectional view of an embodiment of the soft contact lens of the present disclosure having a circumferential groove and a plurality of fenestrations, the soft contact lens positioned or disposed over a corneal surface of the eye.
Figure 3B:
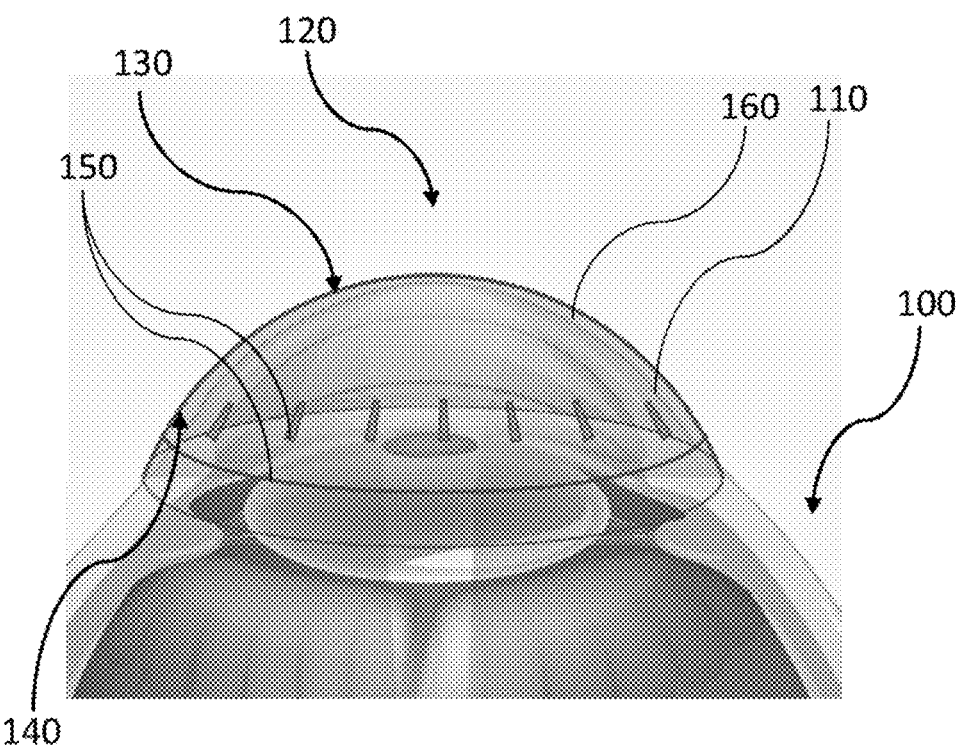

FIG. 3 shows a cross section of an exemplary soft contact lens of the present disclosure.

The sagittal height 330 of the contact lens describes the height from the central apex of the posterior surface 140 of the lens to the plane that the peripheral edges of the lens circumscribe. The sagittal height 330 of the covering 120 may be at least about 1 µm, 1.25 µm, 1.5 µm, 1.75 µm, 2 µm, 2.25 µm, 2.5 µm, 2.75 µm, 3 µm, 3.25 µm, 3.5 µm, 3.75 µm, 4 µm, 4.25 µm, 4.5 µm, 4.6 µm, 4.7 µm, 4.8 µm, 4.9 µm, 5 µm, 5.1 µm, 5.2 µm, 5.3 µm, 5.4 µm, 5.5 µm, 5.6 µm, 5.7 µm, 5.8 µm, 5.9 µm, 6 µm, 6.1 µm, 6.2 µm, 6.3 µm, 6.4 µm, 6.5 µm, 7 µm, 7.5 µm, 8 µm, 8.5 µm, 9 µm, 9.5 µm, 10 µm, 15 µm, 20 µm, 25 µm, 30 µm, 35 µm, 40 µm, 45 µm, 50 µm, or more. In some examples, the sagittal height 330 of the covering 120 may be 50 µm, 45 µm, 40 µm, 35 µm, 30 µm, 25 µm, 20 µm, 15 µm, 10 µm, 9.5 µm, 9 µm, 8.5 µm, 8 µm, 7.5 µm, 7 µm, 6.5 µm, 6.4 µm, 6.3 µm, 6.2 µm, 6.1 µm, 6 µm, 5.9 µm, 5.8 µm, 5.7 µm, 5.6 µm, 5.5 µm, 5.4 µm, 5.3 µm, 5.2 µm, 5.1 µm, 5 µm, 4.9 µm, 4.8 µm, 4.7 µm, 4.6 µm, 4.5 µm, 4.25 µm, 4 µm, 3.75 µm, 3.5 µm, 3.25 µm, 3 µm, 2.75 µm, 2.5 µm, 2.25 µm, 2 µm, 1.75 µm, 1.5 µm, 1.25 µm, 1 µm, or less. The sagittal height 330 may be within a range defined by any two of the preceding values.

The continuous lens body 201 of covering 120 may comprise one or more optical regions 310 defined by the ratio between the radius of curvature 301 at the posterior surface 140 and the radius of curvature 303 at the anterior surface 130 for a given area of the continuous lens body. In some embodiments, the ratio between the radius of curvature 301 at the posterior surface 140 and the radius of curvature 303 at the anterior surface 130 is at least about 0.5. In some embodiments, the ratio between the radius of curvature 301 at the posterior surface 140 and the radius of curvature 303 at the anterior surface 130 is at most about 2.

The ratio between the radius of curvature 301 at the posterior surface 140 and the radius of curvature 303 at the anterior surface 130 may be within a range defined by any two of the preceding values. As an example, the ratio between the radius of curvature 301 at the posterior surface 140 and the radius of curvature 303 at the anterior surface 130 be about 0.9 mm. In some examples, the ratio between the radius of curvature 301 at the posterior surface 140 and the radius of curvature 303 at the anterior surface 130 may be within a range from about 0.5 to about 2.

The one or more optical regions 310 may be positioned in the suspended portions of the continuous lens body 201, such that the one or more optical regions 310 is positioned over the free volume 160. The one or more optical regions 310 may be positioned in the suspended portions of the continuous lens body 201, such that the one or more optical regions 310 is positioned over at least a portion of the free volume 160. The one or more optical regions 310 may be positioned away from the suspended portions of the continuous lens body 210, such that the one or more optical regions 310 are not positioned over any portion of the free volume 160. The diameter of the one or more optical regions 310 may be the same as the diameter of the free volume 160. The diameter of the one or more optical regions 310 may be smaller than the diameter of the free volume 160. The diameter of the one or more optical regions 310 may be larger than diameter of the free volume 160.

The diameter of the one or more optical regions 310 may be at least about 2 mm, 2.5 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, or any values therebetween. In some examples, the diameter of the one or more optical regions 310 may be at most about 12 mm, 11.5 mm, 11 mm, 10.5 mm, 10 mm, 9.5 mm, 9 mm, 8.5 mm, 8 mm, 7.5 mm, 7 mm, 6.5 mm, 6 mm, 5.5 mm, 5 mm, 4.5 mm, 4 mm, 3.5 mm, 3 mm, 2.5 mm, 2 mm, or any values therebetween. The diameter of the one or more optical regions 310 may be within a range defined by any two of the preceding values. As an example, the diameter of the one or more optical regions 310 may be about 8 mm. In some examples, the diameter of the one or more optical regions 310 may be within a range from about 6 mm to about 9 mm.

The radius of curvature 301 of the posterior surface 140 of the one or more optical regions 310 (i.e., base curve or BC of the optical region) may be at least about 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, or any values therebetween. In some examples, the radius of curvature 301 of the posterior surface 140 of the one or more optical regions 310 may be at most about 12 mm, 11.5 mm, 11 mm, 10.5 mm, 10 mm, 9.5 mm, 9 mm, 8.5 mm, 8 mm, 7.5 mm, 7 mm, 6.5 mm, 6 mm, or any values therebetween. The radius of curvature 301 of the posterior surface 140 of the one or more optical regions 310 may be within a range defined by any two of the preceding values. As an example, the radius of curvature 301 of the posterior surface 140 or the one or more optical regions 310 may be about 8 mm. In some examples, the radius of curvature 301 of the posterior surface 140 or the one or more optical regions 310 may be within a range from about 6 mm to about 12 mm.

The radius of curvature 303 of the anterior surface 130 of the one or more optical regions 310 may be at least about 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, or any values therebetween. In some examples, the radius of curvature 303 of the anterior surface 130 of the one or more optical regions 310 may be at most about 12.5 mm, 12 mm, 11.5 mm, 11 mm, 10.5 mm, 10 mm, 9.5 mm, 9 mm, 8.5 mm, 8 mm, 7.5 mm, 7 mm, 6.5 mm, 6 mm, 5.5 mm, 5 mm, or any values therebetween. The radius of curvature 303 of the anterior surface 130 of the one or more optical regions 310 may be within a range defined by any two of the preceding values. As an example, the radius of curvature 303 of the anterior surface 130 of the one or more optical regions 310 may be about 8.5 mm. In some examples, the second radius of curvature 303 may be within a range from about 5 mm to about 12.5 mm.

The one or more optical regions 310 may be each independently defined by a ratio between a radius of curvature at the posterior surface 301 and a radius of curvature at the anterior surface 303. The one or more optical regions 310 may each independently be configured to provide a different optical power to the eye. For example, the ratio between the radius of curvature 301 at the posterior surface 140 and the radius of curvature 303 at the anterior surface 130 for each of the one or more optical regions 310 may be different, such that each of the one or more optical regions 310 may provide different optical power to the eye. The one or more optical regions 310 may be a plurality of optical regions. The one or more optical regions 310 may be simultaneous or segmented. The one or more simultaneous optical regions may be concentric (or annular), aspheric (gradual change of curvature along either the posterior 140 or anterior 130 surface), or diffractive. In some embodiments, the soft contact lenses are bifocal lenses or multifocal lens. In some embodiments, the bifocal or multifocal lenses have two or more optical regions having two or more optical powers. In some embodiments, the one or more optical regions 310 may each independently be configured to correct an ocular refractive error or aberration, such that at least one of the one or more optical regions 310 is configured to correct an ocular refractive error or aberration. In some embodiments, the one or more optical regions 310 may each independently be configured to mask an astigmatism, such that at least one of the one or more optical regions 310 is configured to correct an ocular refractive error or aberration.

The continuous lens body 201 have a uniform thickness throughout the one or more optical regions 310. In some examples, the continuous lens body 201 may have a non-uniform thickness throughout the one or more optical regions 310. The thickness of the one or more optical regions 310 may be at least about 40 μm, 50 μm, 60 μm, 70 μm, 80 μm, 90 μm, 100 microns, 150 μm, 200 μm, 250 μm, 300 μm, 350 μm, 400 μm, 450 μm, 500 μm, 550 μm, 600 μm, or any values therebetween. The thickness of the one or more optical regions 310 may be at most about 600 μm, 550 μm, 500 μm, 450 μm, 400 μm, 350 μm, 300 μm, 250 μm, 200 μm, 150 μm, 100 μm, 90 μm, 80 μm, 70 μm, 60 μm, 50 μm, 40 μm, or any values therebetween. The thickness of the one or more optical regions 310 may be within a range defined by any two of the preceding values. As an example, the thickness of the one or more optical regions 310 may be about 300 μm. In some examples, the thickness of the one or more optical regions 310 may be within a range from about μm, to about 500 μm.

The continuous lens body 201 have a uniform thickness throughout the one or more non-optical regions 320. In some examples, the continuous lens body 201 may have a non-uniform thickness throughout the one or more non-optical regions 320. The thickness of the one or more non-optical regions 310 may be at least about 40 μm, 50 μm, 60 μm, 70 μm, 80 μm, 90 μm, 100 microns, 150 μm, 200 μm, 250 μm, 300 μm, 350 μm, 400 μm, 450 μm, 500 μm, 550 μm, 600 μm, 650 μm, 700 μm, 750 μm, or any values therebetween. The thickness of the one or more non-optical regions 320 may be at most about 800 μm, 750 μm, 700 μm, 650 μm, 600 μm, 550 μm, 500 μm, 450 μm, 400 μm, 350 μm, 300 μm, 250 μm, 200 μm, 150 μm, 100 μm, 90 μm, 80 μm, 70 μm, 60 μm, 50 μm, 40 μm, or any values therebetween. The thickness of the one or more optical regions 320 may be within a range defined by any two of the preceding values. As an example, the thickness of the one or more non-optical regions 320 may be about 200 μm. In some examples, the thickness of the one or more non-optical regions 320 may be within a range from about 50 μm, to about 750 μm.

The continuous lens body 201 of the soft contact lens may comprise one or more non-optical regions. 320 defined radius of curvature 302 at the posterior surface 140 (i.e., base curve or BC of the non-optical region) and a radius of curvature 304 at the anterior surface 130.

The radius curvature 302 of the posterior surface 140 of the one or more non-optical regions 320 may be at least 6 mm, 6.1 mm, 6.2 mm, 6.3 mm, 6.4 mm, 6.5 mm, 6.6 mm, 6.7 mm, 6.8 mm, 6.9 mm, 7 mm, 7.1 mm, 7.2 mm, 7.3 mm, 7.4 mm, 7.5 mm, 7.6 mm, 7.7 mm, 7.8 mm, 7.9 mm, 8 mm, 8.1 mm, 8.2 mm, 8.3 mm, 8.4 mm, 8.5 mm, 8.6 mm, 8.7 mm, 8.8 mm, 8.9 mm, 9 mm, 9.1 mm, 9.2 mm, 9.3 mm, 9.4 mm, 9.5 mm, 9.6 mm, 9.7 mm, 9.8 mm, 9.9 mm, 10 mm, 10.1 mm, 10.2 mm, 10.3 mm, 10.4 mm, 10.5 mm, 10.6 mm, 10.7 mm, 10.8 mm, 10.9 mm, 11 mm, 11.1 mm, 11.2 mm, 11.3 mm, 11.4 mm, 11.5 mm, 11.6 mm, 11.7 mm, 11.8 mm, 11.9 mm, 12 mm, 12.5 mm, 13 mm, 14 mm, 14.5 mm, 15 mm or any values therebetween. In some examples, the radius curvature 302 of the posterior surface 140 of the one or more non-optical regions 320 may be at most about 15 mm, 14.5 mm, 14 mm, 13 mm, 12.5 mm, 12 mm, 11.9 mm, 11.8 mm, 11.7 mm, 11.6 mm, 11.5 mm, 11.4 mm, 11.3 mm, 11.2 mm, 11.1 mm, 11 mm, 10.9 mm, 10.8 mm, 10.7 mm, 10.6 mm, 10.5 mm, 10.4 mm, 10.3 mm, 10.2 mm, 10.1 mm, 10 mm, 9.9 mm, 9.8 mm, 9.7 mm, 9.6 mm, 9.5 mm, 9.4 mm, 9.3 mm, 9.2 mm, 9.1 mm, 9 mm, 8.9 mm, 8.8 mm, 8.7 mm, 8.6 mm, 8.5 mm, 8.4 mm, 8.3 mm, 8.2 mm, 8.1 mm, 8 mm, 7.9 mm, 7.8 mm, 7.7 mm, 7.6 mm, 7.5 mm, 7.4 mm, 7.3 mm, 7.2 mm, 7.1 mm, 7 mm, 6.9 mm, 6.8 mm, 6.7 mm, 6.6 mm, 6.5 mm, 6.4 mm, 6.3 mm, 6.2 mm, 6.1 mm, 6 mm, or any values therebetween. The radius curvature 302 of the posterior surface 140 of the one or more non-optical regions 320 may be within a range defined by any two of the preceding values. As an example, the radius curvature 302 of the posterior surface 140 of the one or more non-optical regions 320 may be about 8 mm. In some examples, the radius curvature 302 of the posterior surface 140 of the one or more non-optical regions 320 may be within a range from about 6 to about 15 mm.

The radius curvature 302 of the anterior surface 130 of the one or more non-optical regions 320 may be at least about 6 mm, 6.1 mm, 6.2 mm, 6.3 mm, 6.4 mm, 6.5 mm, 6.6 mm, 6.7 mm, 6.8 mm, 6.9 mm, 7 mm, 7.1 mm, 7.2 mm, 7.3 mm, 7.4 mm, 7.5 mm, 7.6 mm, 7.7 mm, 7.8 mm, 7.9 mm, 8 mm, 8.1 mm, 8.2 mm, 8.3 mm, 8.4 mm, 8.5 mm, 8.6 mm, 8.7 mm, 8.8 mm, 8.9 mm, 9 mm, 9.1 mm, 9.2 mm, 9.3 mm, 9.4 mm, 9.5 mm, 9.6 mm, 9.7 mm, 9.8 mm, 9.9 mm, 10 mm, 10.1 mm, 10.2 mm, 10.3 mm, 10.4 mm, 10.5 mm, 10.6 mm, 10.7 mm, 10.8 mm, 10.9 mm, 11 mm, 11.1 mm, 11.2 mm, 11.3 mm, 11.4 mm, 11.5 mm, 11.6 mm, 11.7 mm, 11.8 mm, 11.9 mm, 12 mm, 12.5 mm, 13 mm, 14 mm, 14.5 mm, 15 mm or any values therebetween. In some examples, radius curvature 302 of the anterior surface 130 of the one or more non-optical regions 320 may be at most about 15 mm, 14.5 mm, 14 mm, 13 mm, 12.5 mm, 12 mm, 11.9 mm, 11.8 mm, 11.7 mm, 11.6 mm, 11.5 mm, 11.4 mm, 11.3 mm, 11.2 mm, 11.1 mm, 11 mm, 10.9 mm, 10.8 mm, 10.7 mm, 10.6 mm, 10.5 mm, 10.4 mm, 10.3 mm, 10.2 mm, 10.1 mm, 10 mm, 9.9 mm, 9.8 mm, 9.7 mm, 9.6 mm, 9.5 mm, 9.4 mm, 9.3 mm, 9.2 mm, 9.1 mm, 9 mm, 8.9 mm, 8.8 mm, 8.7 mm, 8.6 mm, 8.5 mm, 8.4 mm, 8.3 mm, 8.2 mm, 8.1 mm, 8 mm, 7.9 mm, 7.8 mm, 7.7 mm, 7.6 mm, 7.5 mm, 7.4 mm, 7.3 mm, 7.2 mm, 7.1 mm, 7 mm, 6.9 mm, 6.8 mm, 6.7 mm, 6.6 mm, 6.5 mm, 6.4 mm, 6.3 mm, 6.2 mm, 6.1 mm, 6 mm, or any values therebetween. The radius curvature 302 of the anterior surface 130 of the one or more non-optical regions 320 may be within a range defined by any two of the preceding values. As an example, the radius curvature 302 of the anterior surface 130 of the one or more non-optical regions 320 may be within a range from about 6 mm to about 15 mm.

In some embodiments, the one or more non-optical regions 320 have a diameter of about 2 mm to about 16 mm. The diameter of the one or more non-optical regions 320 may be at least about 2 mm, 2.5 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, or any values therebetween. In some examples, the diameter of the one or more non-optical regions 320 may be at most about 16 mm, 15.5 mm, 15 mm, 14.5 mm, 14 mm, 13.5 mm, 13 mm, 12.5 mm, 12 mm, 11.5 mm, 11 mm, 10.5 mm, 10 mm, 9.5 mm, 9 mm, 8.5 mm, 8 mm, 7.5 mm, 7 mm, 6.5 mm, 6 mm, 5.5 mm, 5 mm, 4.5 mm, 4 mm, 3.5 mm, 3 mm, 2.5 mm, 2 mm, or any values therebetween. The diameter of the one or more non-optical regions 320 may be within a range defined by any two of the preceding values.

In some embodiments, the ratio of the diameter of the optical region 310 to the diameter of the non-optical region 320 is from about 1:8 to about 7:8.

In some embodiments, the at least one discrete discontinuity 150 is positioned in the optical region 310. In some embodiments, the at least one discrete discontinuity 150 is positioned in the non-optical region 320. In some embodiments, the at least one discrete discontinuity 150 is positioned in both the optical 310 and non-optical regions 320.

Provided herein are methods for making the covering. The at least one discrete discontinuity 150 of the covering 120 may be formed by molding, machining, chemical etching, and/or laser etching. In some examples, the at least one discrete discontinuity 150 may be formed by methods other than molding or etching as will be understood by one of ordinary skill in the art based on the teachings herein. The anterior surface 130 of the continuous body may be characterized by a substantially spherical profile. For example, the substantially spherical profile may be molded or etched. The continuous lens body 201 of the covering 120 may be made of a single material. The continuous lens body 201 of the covering 120 may be made of a single material that has substantially uniform mechanical properties throughout. The covering 120 may be made of a single polymeric material. For example, the continuous lens body 201 may comprise a hydrogel (e.g., a silicone hydrogel). The continuous lens body 201 may be made from a single material selected from diacetone acrylamide, N,N-dimethylacrylamide, 2-hydroxyethyl methacrylate, methacrylic acid, methyl methacrylate, N-carboxl vinyl ester, N-vinyl pyrrolidone, poly[dimethylsiloxyl] di[silybutanol]bis[vinyl carbamate], phosphorylcholine, tris-(trimethylsiloxysilyl) propylvinyl carbamate, tris-(hydroxylmethyl) aminomethane, siloxane, or polyvinylpyrrolidone.

The material used in continuous lens body 201 may be biocompatible, inert, non-toxic, and/or non-invasive to the eye of the subject. The material may facilitate fitting the covering on the eye. The material used in the continuous lens body 201 may be a soft material. The soft material may make the covering comfortable on the eye of the subject.

The covering may comprise one or more of many optically clear materials, such as synthetic materials or natural materials. The covering may comprise collagen-based materials. Such collagen-based materials, and combinations thereof, are described in U.S. patent application Ser. No. 12/384,659, filed Apr. 6, 2009, entitled "Therapeutic Device for Pain Management and Vision, U.S. Pub. No. US 2010-0036488 A1, published on 11 Feb. 2010, which is herein incorporated by reference in its entirety for all purposes. Alternatively, or in combination, the covering may comprise a known synthetic material, such as hydroxyethyl methacrylate (HEMA) hydrogel, hydrogel, silicone, hydrated silicone, and derivatives thereof. For example, the optically clear material may comprise one or more of silicone, silicone hydrogel, silicone comprising resin, silicone comprising silicate, acrylate, and collagen. A silicone may comprise a cured silicone that is two-part heat cured and room-temperature vulcanized. For example, polydimethyl siloxane (such as NuSil, or poly(dimethyl) (diphenyl) siloxane) may be used to mold the covering, for example with less than 10% water content so as to increase oxygen diffusion through the covering. The covering 120 may comprise perfluoropolyethers or fluorofocal. The covering may comprise an elastic material such as silicone. The material may allow the covering to seal the cornea.

The covering 120 may comprise a single material that is uniformly cured. The material used to make the continuous lens body 201 can be cured with a hardness, size, and shape such that the continuous lens body 201 has a modulus. The modulus of the continuous lens body 201 may be at least about 0.1 megapascals (MPa), 0.2 MPa, 0.3 MPa, 0.4 MPa, 0.5 MPa, 0.6 MPa, 0.7 MPa, 0.8 MPa, 0.9 MPa, 1 MPa, 1.1 MPa, 1.2 MPa, 1.3 MPa, 1.4 MPa, 1.5 MPa, 1.6 MPa, 1.7 MPa, 1.8 MPa, 1.9 MPa, 2 MPa, 2.1 MPa, 2.2 MPa, 2.3 MPa, 2.4 MPa, 2.5 MPa, 2.6 MPa, 2.7 MPa, 2.8 MPa, 2.9 MPa, 3 MPa, 4 MPa, 5 MPa, 6 MPa, 7 MPa, 8 MPa, 9 MPa, 10 MPa, or more. The modulus of the continuous lens body 201 may be at most about 10 MPa, 9 MPa, 8 MPa, 7 MPa, 6 MPa, 5 MPa, 4 MPa, 3 MPa, 2.9 MPa, 2.8 MPa, 2.7 MPa, 2.6 MPa, 2.5 MPa, 2.4 MPa, 2.3 MPa, 2.2 MPa, 2.1 MPa, 2 MPa, 1.9 MPa, 1.8 MPa, 1.7 MPa, 1.6 MPa, 1.5 MPa, 1.4 MPa, 1.3 MPa, 1.2 MPa, 1.1 MPa, 1 MPa, 0.9 MPa, 0.8 MPa, 0.7 MPa, 0.6 MPa, 0.5 MPa, 0.4 MPa, 0.3 MPa, 0.2 MPa, 0.1 MPa, or less. The modulus of the continuous lens body 201 may be within a range defined by any two of the preceding values. For instance, the modulus of the continuous lens body 201 may be from about 0.1 MPa to about 10 MPa, or from about 0.1 MPa to about 4 MPa. The modulus of the continuous lens body 201 may be uniform throughout.

The covering 120 may comprise a single material has a rigidity range from about 1.25E+04 MPa*μm$^3$ to about 5.00E+08 MPa*μm$^3$. The mechanical properties of any feature of the lenses described herein, depend on both the geometry of feature and the material of the feature (including the material's properties). Aspects of the mechanical properties of the continuous lens body are described using the mechanical model of a simply supported circular plate. In this model, the deflection of the simply supported plate ("D") is proportional to the Young's modulus ("E") multiplied by the thickness ("t") cubed or $D = Et^3/(12*(1-v^2))$. Other parameters of the model (such as, radius of plate, uniform loading, and Poisson's ratio ("v")) may be treated as constants when comparing various modulus and thickness configurations. When comparing the lenses of the present disclosure, the current description utilizes unit's customary to contact lens designers of Megapascals ("MPa") for Young's Modulus and micrometers ("um") for thickness.

The material used to make the continuous lens body 201 may comprise, for example, silicone elastomer having optically clear silicate disposed therein. In some cases, the material may have a water content of at most about 20%, 15%, 10%, 9% 8%, 7%, 6%, 5%, 4%, 3%, 2%, 1%, or less. The material may have a water content of at least about 1%, 2%, 3%, 4%, 5%, 6%, 7%, 8%, 9%, 10%, 15%, 20%, or more. The material may have a water content that is within a range defined by any two of the preceding values. An example material may contain at most about 5% water content. In some cases, the lens covering may have a high oxygen permeability (Dk), which in some cases may exceed 150. The silicone lens comprising silicate can be treated to provide a wettable surface. The lens may comprise a hydrogel, for example silicone hydrogel. In some examples, the water content of the lens material may be at least about 10%, 15%, 20%, 25%, 30%, 35%, 40%, 45%, 50%, 52%, 54%, 56%, 58%, 60%, 62%, 64%, 66%, 68%, 70%, 72%, 74%, 76%, 78%, 80%, or more. In some examples, the water content of the lens material may be at most about 80%, 78%, 76%, 74%, 72%, 70%, 68%, 66%, 64%, 62%, 60%, 58%, 56%, 54%, 52%, 50%, 45%, 40%, 35%, 30%, 25%, 20%, 15%, 10%, or less. The water content of the lens material may be within a range defined by any two of the preceding values. For instance, the covering/lens material may comprise a water content within a range from about 5% to about 35%.

The covering 120 may comprise silicone or silicone hydrogel having a low ionoporosity such that covering 120 seals to the cornea. For example, the covering 120 may comprise silicone hydrogel comprising a low ion permeability, and the range of water can be from about 5% to about 35%, such that the Dk is 100 or more. The low ion permeability may comprise an Ionoton Ion Permeability Coefficient of at most about $0.25 \times 10^{-3}$ cm$^2$/sec so as to seal the cornea. For example, the Ionoton Ion Permeability Coefficient may be at most about $0.08 \times 10^{-3}$ cm$^2$/sec. The low ion permeability may comprise an Ionoton Ion Permeability Coefficient of at most about $2.6 \times 10^{-6}$ mm$^2$/min to seal the cornea. For example, the Ionoton Ion Permeability Coefficient may be at most about $1.5 \times 10^{-6}$ mm$^2$/min.

The covering 120 may comprise a wettable surface coating disposed on at least the anterior surface 130 of the covering 120, such that the tear film of the patient is smooth over the covering and the patient can see. The wettable surface coating may comprise a lubricious coating for patient comfort. For example, the lubricious coating may lubricate the eye when the patient blinks. The wettable coating may comprise a contact angle of at most about 85 degrees, 80 degrees, 75 degrees, 70 degrees, 65 degrees, 60 degrees, 55 degrees, 50 degrees, 45 degrees, 40 degrees, 35 degrees, 30 degrees, 25 degrees, 20 degrees, 15 degrees, 10 degrees, 5 degrees, or less. The wettable coating may comprise a contact angle of at least about 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, or more. The wettable coating may comprise a contact angle that is within a range defined by any two of the preceding values. For example, the contact angle can be within a range from about 55 to 65 degrees to provide a surface with a smooth tear layer for vision. For example, the wettable coating can be disposed on both an upper surface and a lower surface of the covering. The upper surface may comprise the wettable coating extending over at least the inner portion.

Provided herein are methods for correcting an ocular refractive error of the eye. Additionally provided herein are methods for correcting astigmatism of the eye. The method may comprise providing any one of the coverings or contact lenses described herein. The continuous lens body 201 of the covering 120 may comprise or be the optical region 310 configured to mask an astigmatism. In some embodiments, the posterior surface 140 of the continuous lens body 201 forms a free volume 160 over the eye 100, the free volume configured to form a tear lens over the corneal surface of the eye 100 to mask an astigmatism. In some examples, a combination of the optical region 310 and the free volume 160 are configured to mask an astigmatism of the eye 100. In some cases, the covering 120 may mask astigmatism independent of the orientation of the covering 120 about a central optical axis of the cornea of the eye 100.

In some examples, the covering 120 may be configured to mask an astigmatism of an eye of a subject. In some cases, the covering 120 may be configured to mask astigmatism up to about 2.5 diopters (D). In some cases, the covering 120 may be configured to mask astigmatism up to about 5 D, 4.75 D, 4.5 D, 4.25 D, 4 D, 3.75 D, 3.5 D, 3.25 D, 3 D, 2.75 D, 2.5 D, 2.25 D, 2.0 D, 1.75 D, 1.5 D, 1 D, 0.7 D, 0.5 D, or less. In some cases, the covering 120 may be configured to mask astigmatism up to about 0.5 D, 0.7 D, 1 D, 1.5 D, 1.75 D, 2.0 D, 2.25 D, 2.5 D, 2.75 D, 3 D, 3.25 D, 3.5 D, 3.75 D, 4 D, 4.25 D, 4.5 D, 4.75 D, 5 D, or more. The covering 120 may be configured to mask an astigmatism that is within a range defined by any two of the preceding values. For example, the astigmatism can be within a range from about 2.25 D to about 2.5 D. The covering 120 may also be configured to mask an astigmatism in increments of 0.01 D due to the sensitivity of the tear lens formation and is not limited to 0.25D increments as is customary in standard toric lens). In some cases, the covering 120 may be configured to mask astigmatism up to about 5 D, 4.9 D, 4.8 D, 4.7 D, 4.6 D, 4.5 D, 4.4 D, 4.3 D, 4.2 D, 4.1 D, 4 D, 3.9 D, 3.8 D, 3.7 D, 3.6 D, 3.5 D, 3.4 D, 3.3 D, 3.2 D, 3.1 D, 3 D, 2.9 D, 2.8 D, 2.7 D, 2.6 D, 2.5 D, 2.4 D, 2.3 D, 2.2 D, 2.1 D, 2.0, 1.9 D, 1.8 D, 1.7 D, 1.6 D, 1.5 D, 1.4 D, 1.3 D, 1.2 D, 1 D, 0.9 D, 0.8 D, 0.7 D, 0.6 D, 0.5 D, 0.4 D, 0.3 D, 0.2 D, 0.1 D, or less. In some cases, the covering 120 may be configured to mask astigmatism up to about 0.1 D, 0.2 D, 0.3 D, 0.4 D, 0.5 D, 0.6 D, 0.7 D, 0.8 D, 0.9 D, 1 D, 1.1 D, 1.2 D, 1.3 D, 1.4 D, 1.5 D, 1.6 D, 1.7 D, 1.8 D, 1.9 D, 2 D, 2.1 D, 2.2 D, 2.3 D, 2.4 D, 2.5 D, 2.6 D, 2.7 D, 2.8 D, 2.9 D, 3 D, 3.1 D, 3.2 D, 3.3 D, 3.4 D, 3.5 D, 3.6 D, 3.7 D, 3.8 D, 3.9 D, 4 D, 4.1 D, 4.2 D 4.3 D, 4.4 D, 4.5 D, 4.6 D, 4.7 D, 4.8 D, 4.9 D, 5 D, or more.

The covering 120 may be configured such that only the spherical power of the lens is required to correct the vision of a subject in need thereof, to their best corrected visual acuity. The covering 120 may be configured to mask an astigmatism such that only the spherical power of the lens is required to correct the vision of a subject in need thereof, to a visual acuity In some cases, the covering 120 may be configured to correct for meridian angles of about 10 degrees to about 1 degree. In some examples, the covering 120 may be configured to correct meridian angels up to about 10 degrees, 9 degrees, 8 degrees, 7 degrees, 6 degrees, 5 degrees, 4 degrees, 3 degrees, 2 degrees, 1 degree, or less. In some cases, the covering 120 may be configured to correct for meridian angles up to about 1 degree, 2 degrees, 3 degrees, 4 degrees, 5 degrees, 6 degrees, 7 degrees, 8 degrees, 9 degrees, 10 degrees, or more. The covering 120 may be configured to correct meridian angle that is within a range defined by any two of the preceding values. For example, the meridian angle can be within a range from about 3 to about 4 degrees.

In some embodiments, the covering 120 may be configured to correct for differences in corneal power between meridians of about 3 D to about 0 D. In some examples, the covering 120 may be configured to correct for differences in corneal power up to about 3 D, 2.9 D, 2.8 D, 2.7 D, 2.6 D, 2.5 D, 2.4 D, 2.3 D, 2.2 D, 2.1 D, 2 D, 1.9 D, 1.8 D, 1.7 D, 1.6 D, 1.5 D, 1.4 D, 1.3 D, 1.2D, 1 D, 0.9 D, 0.8 D, 0.7 D, 0.6 D, 0.5 D, 0.4 D, 0.3 D, 0.2 D, 0.1 D, or less. In some examples, the covering 120 may be configured to correct for differences in corneal power up to about 0.1 D, 0.2 D, 0.3 D, 0.4 D, 0.5 D, 0.6 D, 0.7 D, 0.8 D, 0.9 D, 1 D, 1.1 D, 1.2 D, 1.3 D, 1.4 D, 1.5 D, 1.6 D, 1.7 D, 1.8 D, 1.9 D, 2 D, 2.1 D, 2.2 D, 2.3 D, 2.4 D 2.5 D, 2.6 D, 2.7 D, 2.8 D, 2.9 D, 3 D, or more. The covering 120 may be configured to correct for differences in corneal power that is within a range defined by any two of the preceding values. For example, the differences in corneal power can be within a range from about 0.5 D and about 2.5 D.

While preferred embodiments of the present disclosure have been shown and described herein, it will be obvious to those skilled in the art that such embodiments are provided by way of example only. It is not intended that the scope of the present disclosure be limited by the specific examples provided within the specification. While the embodiments of the present disclosure have been described with reference to the aforementioned specification, the descriptions and illustrations of the embodiments herein are not meant to be construed in a limiting sense. Numerous variations, changes, and substitutions will now occur to those skilled in the art without departing from the scope of the present disclosure. Furthermore, it shall be understood that all aspects of the present disclosure are not limited to the specific depictions, configurations or relative proportions set forth herein which depend upon a variety of conditions and variables. It should be understood that various alternatives to the embodiments of the present disclosure described herein may be employed in practicing the embodiments of the present disclosure. It is therefore contemplated that the present disclosure shall also cover any such alternatives, modifications, variations or equivalents. It is intended that the following claims define the scope of the disclosure and that methods and structures within the scope of these claims and their equivalents be covered thereby.

In some embodiments, a covering comprises a smoothed transition. In some embodiments, transitions between different curvatures on the anterior surface of the contact lens can irritate the eyelid. In some embodiments transitions formed between different curvatures (e.g., FIG. 8A, 810, 820, 830) on the posterior surface of the contact lens can irritate the cornea. In some embodiments, abrupt transitions on the posterior surface between such curvatures may form a focal point that may press against the cornea and reduce mobility (e.g., of the contact lens).

In some embodiments, the transition between zones of differing curvature may be modified by adding a transitional curve between the two zones (e.g., FIG. 8B, 850), thereby improving the comfort and/or mobility of the contact lens.

In some embodiments, a smoothed transition (e.g., on the anterior surface) may distribute the pressure of the lens on the eyelid over a wider (e.g., larger) area. In some embodiments, a smoothed transition (e.g., on the posterior surface) may distribute pressure of the lens on the cornea and allow movement of the lens without disrupting the corneal epithelium.

Figure 8A:
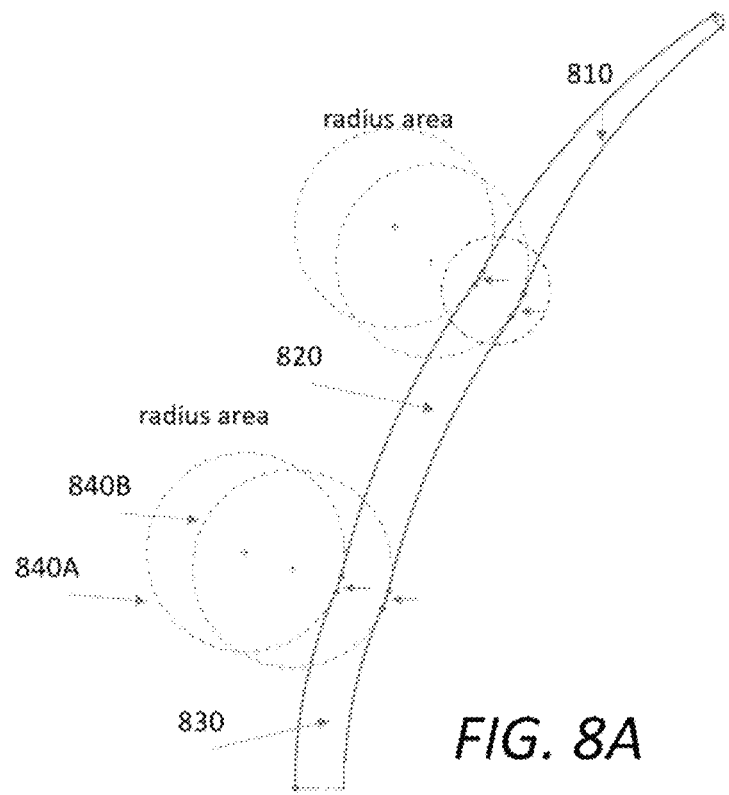
FIGS. 8A to 8E illustrate a side sectional view of an embodiment of the soft contact lens of the present disclosure having a smoothing of transition zone, the illustration shows the relationships between the smoothed transition between different curvatures of the soft contact lens and the relationships between the radius of the transitional curve and width of the transition.
Figure 8B:
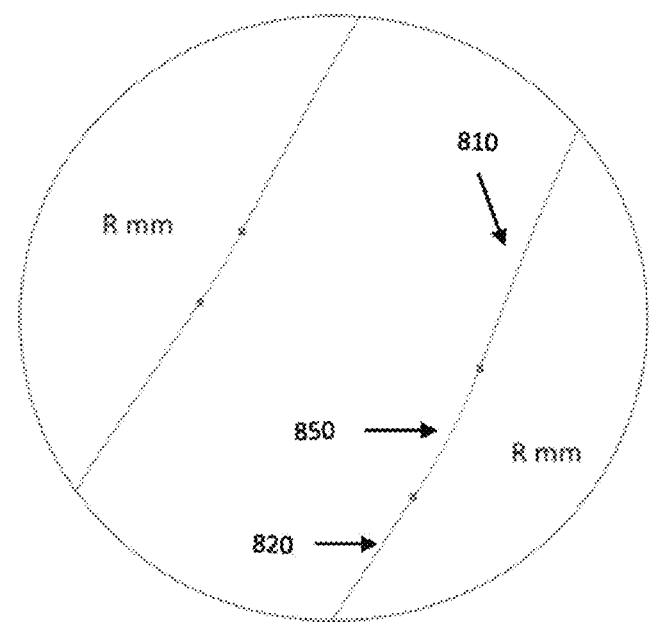

In some embodiments, a transitional zone can be described as a radius of curvature (in mm) (see FIG. 8A, 840A and 840B). In some embodiments, the direction of a transitional curve is directed to the opposite direction of the lens curvature to blend the two curvatures together (see FIG. 8B, 850). In some embodiments, the direction of the transitional curve is in the same direction of the lens curvature to blend the two curvatures together. In some embodiments, both edges of the transitional curve are tangential to the adjacent curves.

In some embodiments, radiused blend transitions comprise a radius of curvature that is from about 0.05 mm to about 100 mm. In some embodiments, radiused blend transitions comprise a radius of curvature that about 0.05 mm, about 0.1 mm, about 0.5 mm, about 1 mm, about 2 mm, about 3 mm, about 5 mm, about 10 mm, about 20 mm, about 30 mm, about 60 mm, or more. In some embodiments, radiused blend transitions may facilitate improved fluid flow through or along a feature of the contact lens.

Figure 8C:
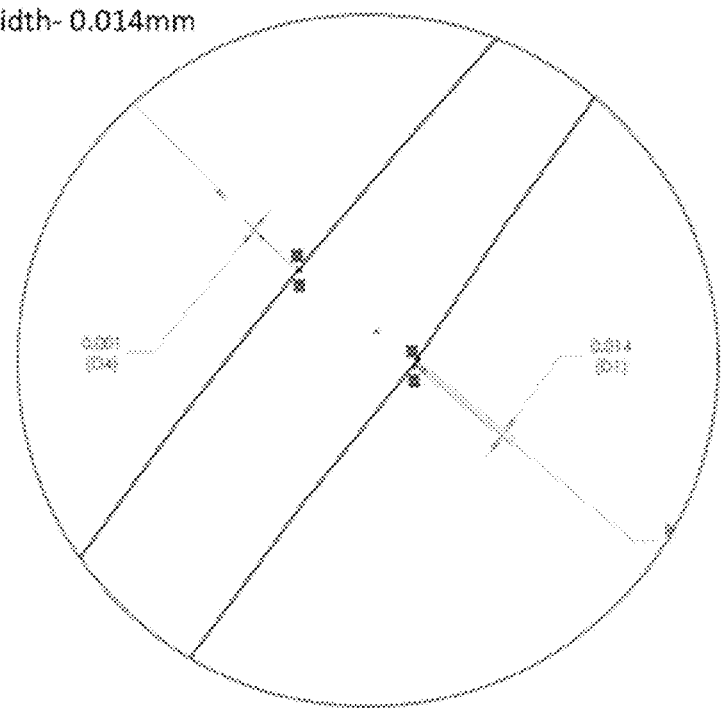
Figure 8D:
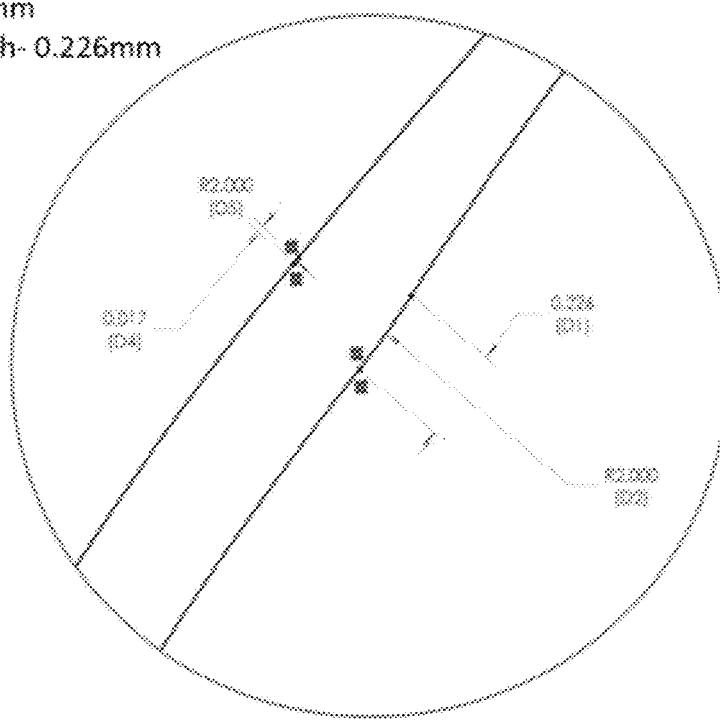
Figure 8E:
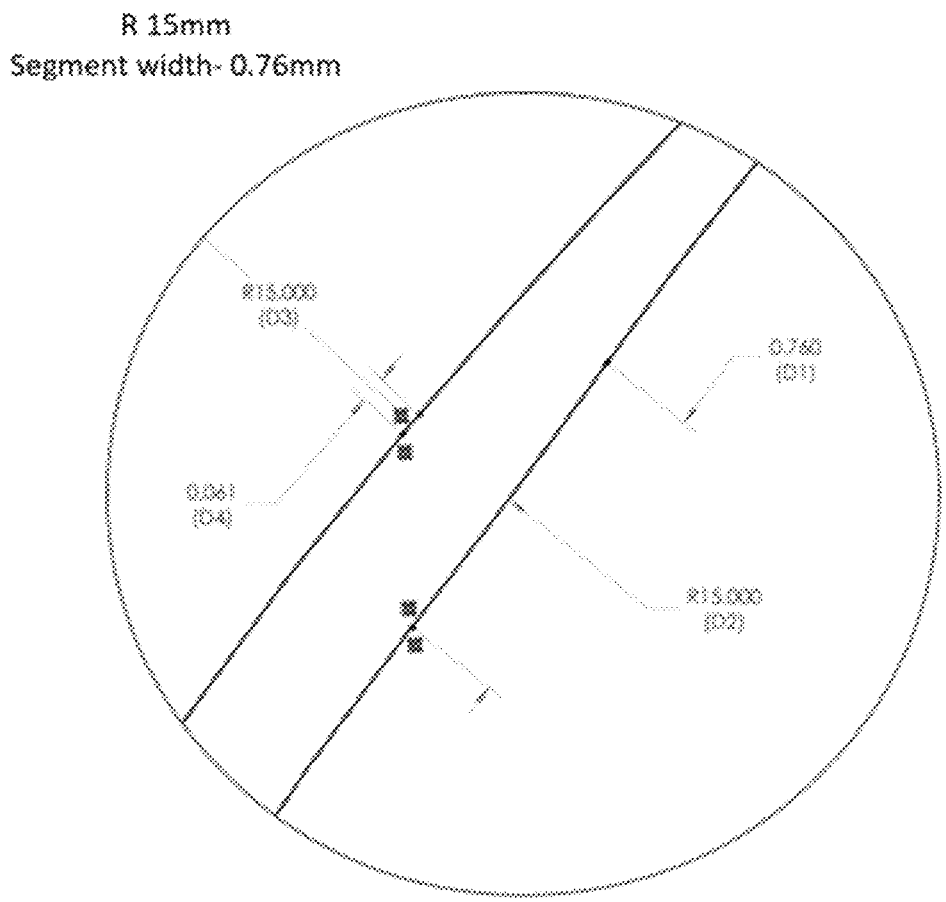

As illustrated in FIGS. 8C to 8E, large radius of curvature values correlate to a wider segment of the feature.

In some embodiments, a covering comprises a waveform groove. In some embodiments, a waveform groove is a discrete discontinuity. In some embodiments, a sharp angle between an edge of the groove and the posterior surface of the contact lens can irritate the eyelid. In some embodiments, abrupt transitions on the posterior surface between such curvatures may form a focal point that may press against the cornea and reduce mobility. In some embodiments, an angular profile of the groove can reduce flow.

Figure 9A:
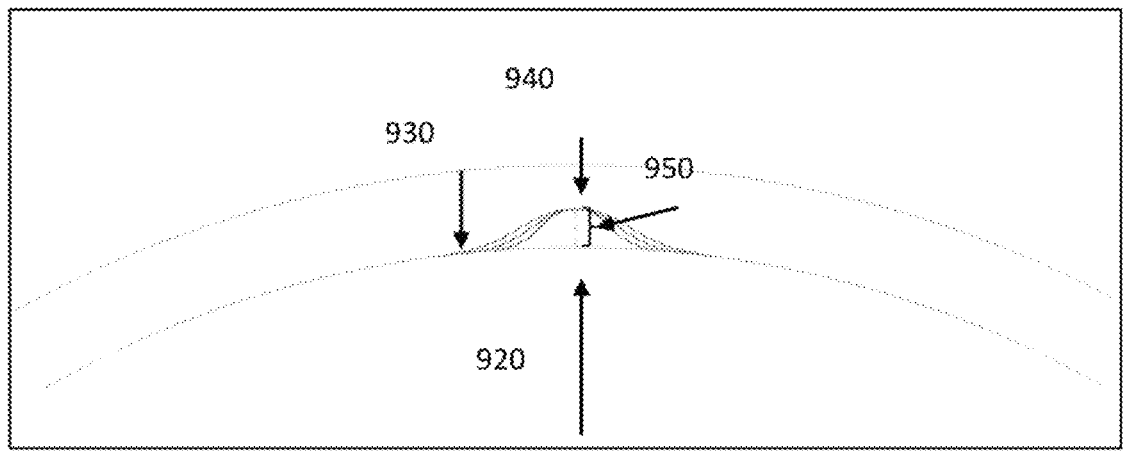
FIGS. 9A to 9C illustrate a side sectional view of an embodiment of the soft contact lens of the present disclosure having a waveform grooves, the illustration shows the structure of the waveform grooves related to lens curvature and the posterior face of the lens

In some embodiments, the transition between the groove edges and the lens curvature as well as the lens top, may be modified by adding a waveform profile that curves the groove edges and groove top (FIG. 9A 920), thereby improving comfort, mobility, and flow of fluid in the contact les. In some embodiments, a waveform groove can be achieved by rounding the edges of a groove (FIG. 9A 930) and rounding the top of a groove (FIG. 9A 940). In some embodiments, a waveform groove comprises a rounded edge, a rounded top, or a combination thereof.

In some embodiments, groove edges of the waveform groove (FIG. 9A 930) are radiuses that are tangent to the curve of the posterior surface of the lens.

In some embodiments, waveform groove on the posterior surface may distribute the pressure of the lens over a wider (e.g., larger) area and allow improved movement of the lens without disrupting the corneal epithelium. In some embodiments, a rounded profile of the waveform groove may enable improved flow through the waveform groove in comparison with an angular groove (e.g., groove that has not been radiused).

Figure 9B:
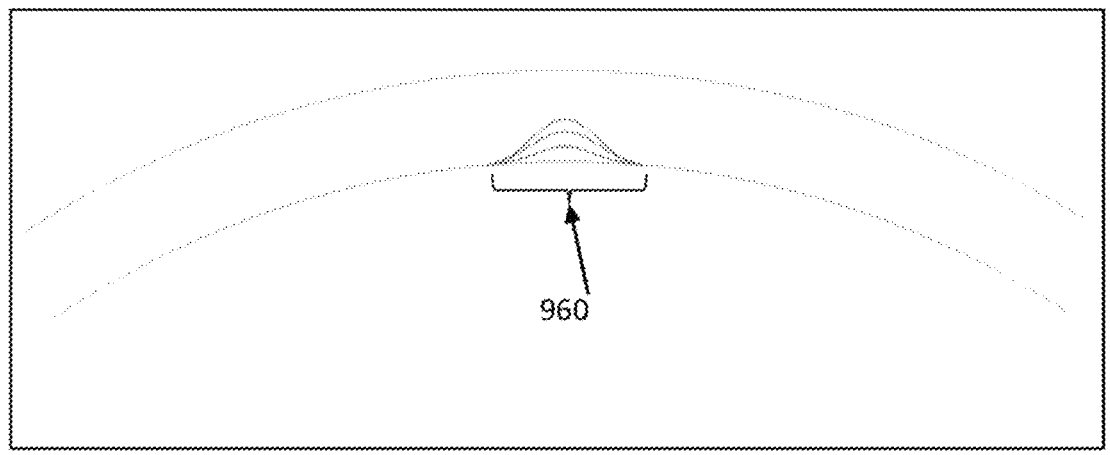

In some embodiments, a waveform groove comprises a wavy structure having a height (FIG. 9A 950) and width (FIG. 9B 960). In some embodiments, the height is the distance from the posterior curvature plane to the peak of the groove. In some embodiments, the width is the distance between the tangents of the groove edges to posterior curvature. In some embodiments, a groove comprises a height from about 5 microns ($\mu m$) to about 400 microns. In some embodiments, a groove comprise a height of about 5 $\mu m$, about 10 $\mu m$, about 20 $\mu m$, about 40 $\mu m$, about 80 $\mu m$, about 160 $\mu m$, about 320 $\mu m$, or more. In some embodiments, a groove comprises a width from about 20 µm to about 1000 µm. In some embodiments, a groove comprises a width of about 20 µm, about 40 µm, about 80 µm, about 160 µm, about 320 µm, about 640 µm, or more.

Figure 9C:
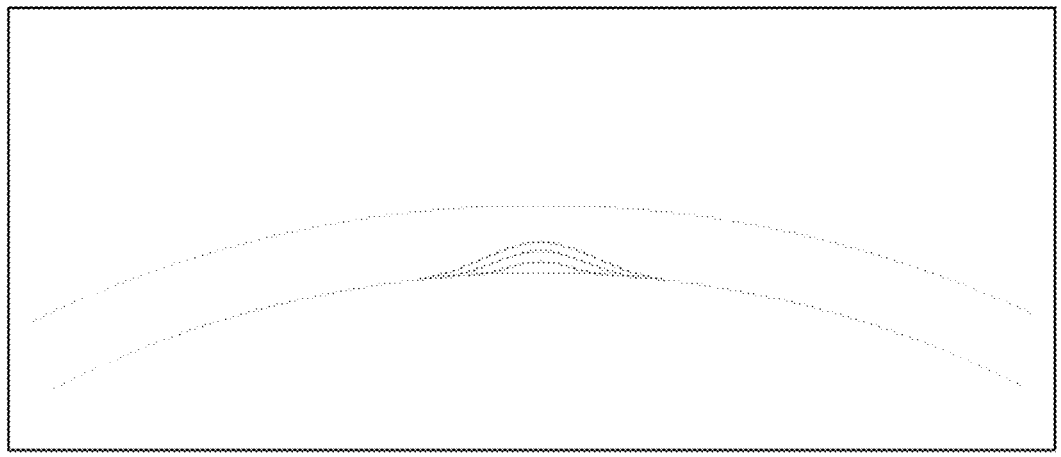

In some embodiments, a configuration of the waveform groove may change along the length of a groove. For example, as seen in FIG. 9A, a waveform groove may comprise different widths, but a same height, where both tips of the groove wave profile are tangent to the lenses central curve and the width of the groove is a variable. For example, as seen in FIG. 9B, a waveform groove may comprise different heights but a same width, where both tips of the groove wave profile are tangent to the lenses central curve, height of the groove is a variable. For example, as seen in FIG. 9C, a waveform groove may comprise different heights and different widths, where both tips of the groove wave profile are tangent to the lenses central curve and height of the groove is variable.

EXAMPLES

The inventions of the present disclosure now being generally described, it will more readily be understood to by reference to the following examples which are included merely for the purpose of illustration of certain aspects and embodiments of the present disclosure and are not intended to limit the scope of the present disclosure in any way.

Example 1: Comparison of Eye Covering Thickness

Figure 7A:
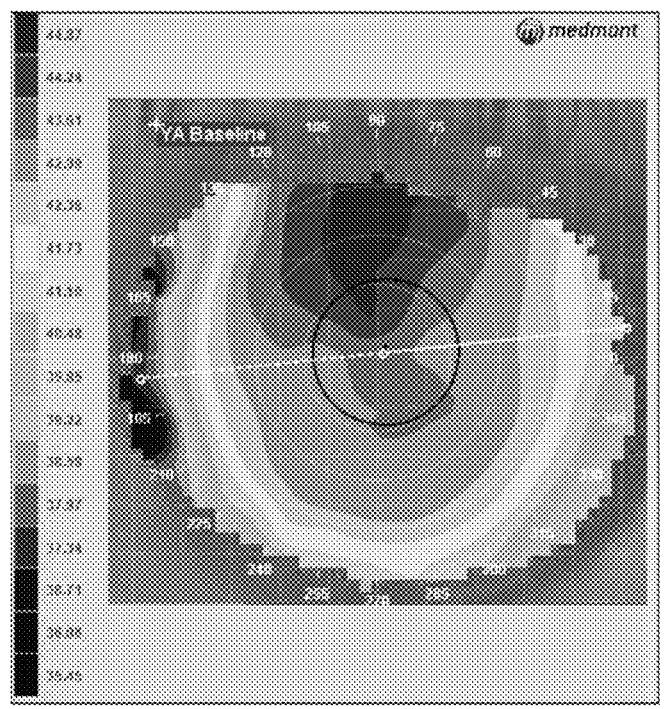
FIGS. 7A and 7B illustrate the topography of a bare eye having an astigmatism, as compared with the topography of the same eye fitted with an exemplary astigmatism correcting soft contact lens of the present disclosure, respectively.
Figure 7B:
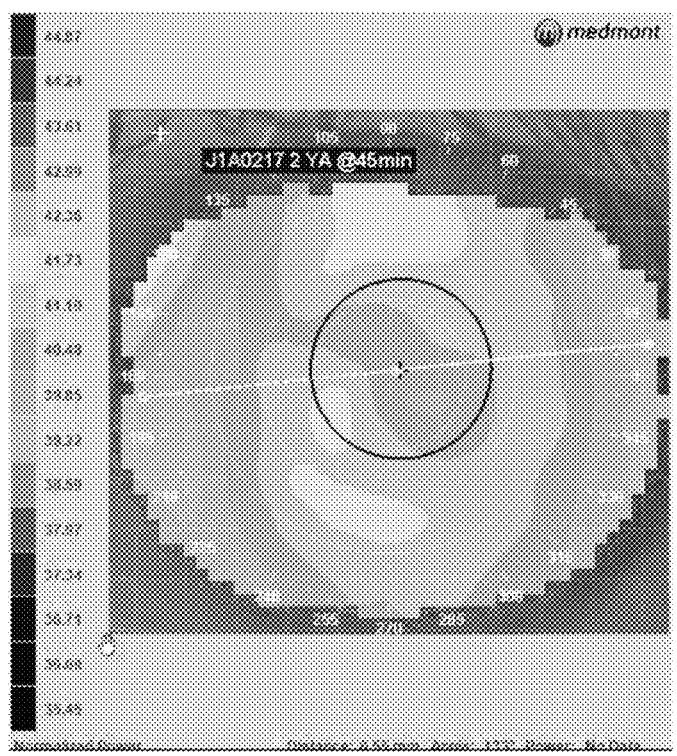

Three sets of astigmatism correcting eye coverings were prepared. The as-prepared eye coverings had a central thickness of 200 µm, 300 µm, and 400 µm, although other thicknesses have been contemplated. The bare eye characteristics of best refraction and corneal topography were measured in subjects having an astigmatism. Five subjects were fitted with the 400 µm central thickness eye covering, three subjects were fitted with the 300 µm thickness eye covering, and one subject was fitted with the 200 µm central thickness eye covering. The amount of astigmatism reduction was compared between the uncorrected eyes, eyes having the 200 µm thick covering, eyes having the 300 µm thick eye covering, and eyes having the 400 µm thick eye coverings. The subjects had an average astigmatism of 1.4 D±0.7 D. Subjects fitted with the 200 µm thick eye coverings had an astigmatism reduction of about 1.5 D. Subjects fitted with the 300 µm thick eye coverings had an astigmatism reduction of about 0.6 D±0.1 D. Subjects fitted with the 400 µm thick eye coverings had an astigmatism reduction of about 0.7 D±0.1 D. All subjects having fitted eye coverings experienced a reduced astigmatism. FIGS. 7A and 7B illustrate the topography of a bare eye having an astigmatism, as compared with the topography of the same eye fitted with the astigmatism correcting eye covering of the present disclosure, respectively. FIG. 7B shows a contact lens with a thickness at the optical region of 400 µm, a radius of curvature at the optical region of 7.86 mm, 8 circular groves positioned 6.6 mm away from the center axis of the lens, the lens capable of masking 0.75 D of an astigmatism of the eye.

What is claimed is:

1. A soft contact lens for correcting an ocular refractive error of an eye, comprising:
  a soft continuous lens body configured to cover a corneal surface of the eye;
  the soft continuous lens body having an anterior surface, a posterior surface, and at least one discrete discontinuity;
  wherein at least a portion of the posterior surface of the soft continuous lens body is configured to be suspended above a corneal surface of the eye when placed thereon forming a free volume between the posterior surface of the soft continuous lens body and the corneal surface;
  wherein at least one sector of the soft continuous lens body is configured to be suspended over the corneal surface to form at least a portion of the free volume when the continuous lens body is disposed over the corneal surface.

2. The lens of claim 1, wherein at least a portion of the free volume is configured to be filled with a fluid to form a tear lens over the corneal surface for correcting an ocular refractive error of the eye.

3. The lens of claim 1, wherein the soft continuous lens body has a uniform Young's modulus.

4. The lens of claim 1, wherein the soft continuous lens body has Young's modulus from about 0.1 MPa to about 4 MPa.

5. The lens of claim 1, wherein the ocular refractive error originates from one or more of a corneal irregularity, coma, astigmatism, or higher order aberrations of the eye.

6. The lens of claim 1, wherein the anterior surface of the soft continuous lens body is axially symmetric.

7. The lens of claim 1, wherein the posterior surface of the soft continuous lens body is axially symmetric.

8. The lens of claim 1, wherein the anterior surface and/or posterior surface of the soft continuous lens body are axially symmetric, and wherein the optical properties of the lens are rotationally independent.

9. The lens of claim 1, wherein the anterior surface and/or posterior surface of the soft continuous lens body are axially symmetric, and wherein the lens corrects the ocular refractive error or an optical aberration of the eye without being rotationally fit to the eye.

10. The lens of claim 1, wherein the soft continuous lens body comprises at least one non-optical region, and wherein the at least one discrete discontinuity is positioned in the at least one non optical region or an optical region or both.

11. The lens of claim 1, wherein the soft continuous lens body further comprises a lens volume.

12. The lens of claim 11, wherein the lens volume is axially symmetric.

13. The lens of claim 11, wherein the lens volume is rotationally symmetric.

14. The lens of claim 1, wherein the lens corrects the ocular refractive error or an optical aberration of the eye when placed thereon irrespective of the orientation of the lens to a meridian of the eye.

15. The lens of claim 1, wherein the lens is made of a single material.

16. The lens of claim 1, wherein the soft continuous lens body has a rigidity range from about 1.25E+04 MPa*µm³ to about 5.00E+08 MPa*µm³.

17. The lens of claim 1, wherein the at least one discrete discontinuity is a channel, fenestration, groove, opening, slit, thin portion, or any combination thereof.

18. The lens of claim 1, wherein the at least one discrete discontinuity is further configured to allow a fluid to flow into and out of the free volume.

19. The lens of claim 1, wherein the free volume between the posterior surface of the soft continuous lens body and the corneal surface has a total volume from about 0.001 µL to 10 µL.

* * * * *